(12) United States Patent
Watanabe et al.

(10) Patent No.: US 6,270,269 B1
(45) Date of Patent: Aug. 7, 2001

(54) TAPE PRINTING DEVICE

(75) Inventors: Kenji Watanabe; Takanobu Kameda; Chieko Aida; Tomoyuki Shimmura, all of Tokyo; Yoshiya Toyosawa, Suwa; Hiroyasu Kurashina, Suwa; Takeshi Hosokawa, Suwa, all of (JP)

(73) Assignees: King Jim Co., Ltd.; Seiko Epson Corporation, both of (JP)

( * ) Notice: Subject to any disclaimer, the term of this patent is extended or adjusted under 35 U.S.C. 154(b) by 0 days.

(21) Appl. No.: 09/119,054

(22) Filed: Jul. 20, 1998

Related U.S. Application Data

(60) Continuation of application No. 08/922,374, filed on Sep. 3, 1997, now Pat. No. 5,860,752, which is a division of application No. 08/682,716, filed on Sep. 23, 1996, now Pat. No. 5,795,086.

(30) Foreign Application Priority Data

| Nov. 29, 1994 | (JP) | ................................. 6-294219 |
| Nov. 29, 1994 | (JP) | ................................. 6-294220 |
| Nov. 30, 1994 | (JP) | ................................. 6-296362 |
| Dec. 7, 1994  | (JP) | ................................. 6-303359 |

(51) Int. Cl.⁷ ............................................. B41J 11/26
(52) U.S. Cl. ............................. 400/615.2; 400/621
(58) Field of Search ........................ 400/61, 76, 83, 400/615.2, 621, 279, 70

(56) References Cited

U.S. PATENT DOCUMENTS

| 5,033,889 |   | 7/1991  | Carney ........................... 400/903 |
| 5,188,470 |   | 2/1993  | Matsubara et al. ............... 400/621 |
| 5,253,334 | * | 10/1993 | Kimura et al. .................... 395/102 |
| 5,348,406 | * | 9/1994  | Yoshiaki et al. ................ 400/615.2 |
| 5,409,317 |   | 4/1995  | Ueno et al. .................... 400/615.2 |
| 5,447,383 |   | 9/1995  | Hirono et al. .................... 400/621 |
| 5,454,653 |   | 10/1995 | Miwa ............................. 400/615.2 |
| 5,464,290 |   | 11/1995 | Watanabe et al. ................ 400/61 |
| 5,494,360 |   | 2/1996  | Watanabe et al. ............. 400/615.2 |
| 5,496,119 | * | 3/1996  | Kawakami et al. ................ 400/70 |
| 5,524,993 |   | 6/1996  | Durst ............................... 400/582 |
| 5,551,785 |   | 9/1996  | Mori et al. ......................... 400/76 |
| 5,651,619 |   | 7/1997  | Nunokawa et al. ................ 400/61 |
| 5,741,082 | * | 4/1998  | Toya ............................... 400/615.2 |
| 5,826,995 | * | 10/1998 | Day et al. ....................... 400/615.2 |
| 5,838,346 | * | 11/1998 | Stemmle, Sr. ....................... 348/37 |

FOREIGN PATENT DOCUMENTS

| 652110     | 10/1995 | (EP) . |
| 55-135963  | 10/1980 | (JP) . |
| 56-103780  | 8/1981  | (JP) . |
| 57-74171   | 5/1982  | (JP) . |
| 60-71266   | 4/1985  | (JP) . |
| 60-132769  | 7/1985  | (JP) . |
| 60-233980  | 11/1985 | (JP) . |
| 60-247578  | 12/1985 | (JP) . |
| 61-25370   | 2/1986  | (JP) . |
| 61-95952   | 5/1986  | (JP) . |
| 63-25547   | 2/1988  | (JP) . |
| 63-162256  | 7/1988  | (JP) . |
| 4246569    | 9/1992  | (JP) . |
| 5305749    | 11/1993 | (JP) . |
| 691964     | 4/1994  | (JP) . |
| 6243135    | 9/1994  | (JP) . |
| 6320826    | 11/1994 | (JP) . |
| 8-1091     | 1/1996  | (JP) . |
| 8-52908    | 2/1996  | (JP) . |

* cited by examiner

*Primary Examiner*—John S. Hilten
*Assistant Examiner*—Charles H. Nolan, Jr.
(74) *Attorney, Agent, or Firm*—Lorusso & Loud

(57) ABSTRACT

When stoppage of printing on a tape is commanded, an automatic non-printing feed of the tape equal to the distance between the print head and a cutter is performed to enable cutting of the tape with minimum waste. Additionally the forming of leading and trailing margins on a printed tape less than the distance between the print head and cutter is enabled by providing deceleration and acceleration coupled with print pulse width variation corresponding to tape movement.

4 Claims, 21 Drawing Sheets

FIG. 14(A)
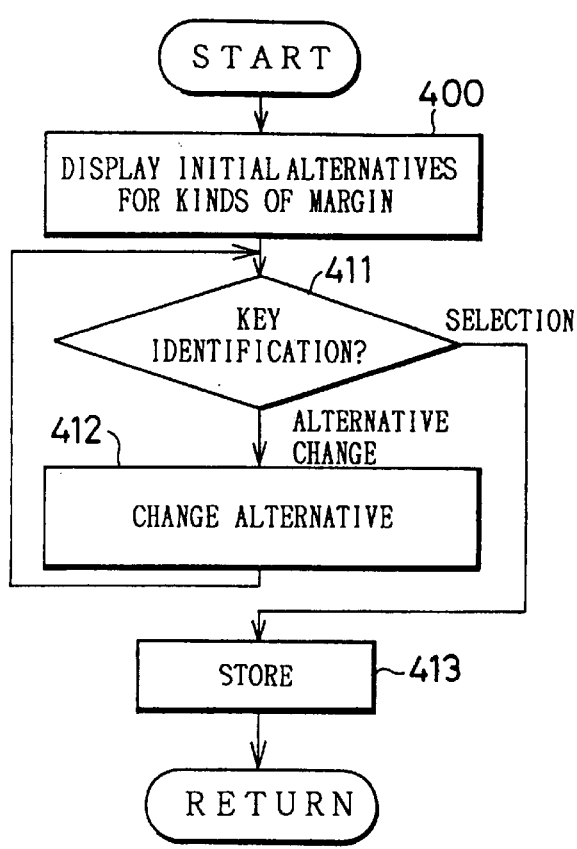
FIG. 14(B)
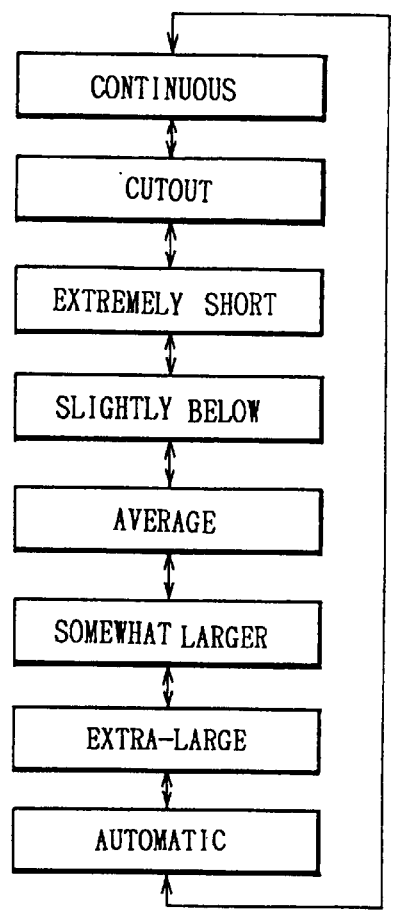
FIG. 14(C)
| DESIGNATED VALUE | CONTINUOUS | CUTOUT | EXTREMELY SHORT | SLIGHTLY BELOW | AVERAGE | SOMEWHAT LARGER | EXTRA-LARGE | AUTOMATIC |
|---|---|---|---|---|---|---|---|---|
| FRONT SPARE PORTION | (9mm) | (9mm) | (9mm) | — | — | — | — | — |
| CUT MARK | PRESENT | — | PRESENT | — | — | — | — | — |
| MARGIN | NONE | 9mm | 1mm | 9mm | 12mm | 17mm | 24mm | SET ACCORDING TO TAPE WIDTH |
FIG. 14(D)
| TAPE WIDTH mm | 6 | 9 | 12 | 18 | 24 |
|---|---|---|---|---|---|
| MARGIN LENGTH mm | 9 | 9 | 12 | 18 | 24 |

FIG. 19

| TAPE WIDTH | 6 | 9 | 12 | 18 | 24 |
|---|---|---|---|---|---|
| MARGIN LENGTH | 3 | 6 | 9 | 12 | 18 |

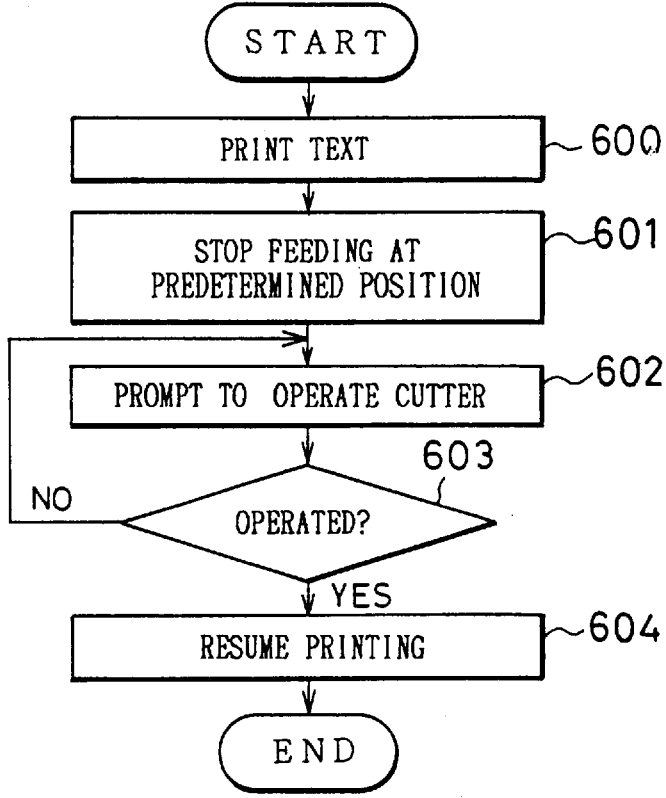

| DURING ACCELERATION | DURING DECELERATION | PULSE WIDTH OF DOT ON SIGNAL |
|---|---|---|
| 1ST PULSE | 5TH PULSE | $\alpha$ TIMES NORMAL PULSE WIDTH |
| 2ND PULSE | 4TH PULSE | $\beta$ TIMES NORMAL PULSE WIDTH |
| 3RD PULSE | 3RD PULSE | $\gamma$ TIMES NORMAL PULSE WIDTH |
| 4TH PULSE | 2ND PULSE | $\delta$ TIMES NORMAL PULSE WIDTH |
| 5TH PULSE | 1ST PULSE | $\xi$ TIMES NORMAL PULSE WIDTH |

$(\alpha < \beta < \cdots < \xi)$
$(\alpha \sim \xi \sim <1)$ a : TAPE WIDTH
b : MAXIMUM PRINTING RANGE
c : CHARACTER SIZE
d : FRONT AND REAR MARGINS

TAPE PRINTING DEVICE

CROSS-REFERENCE TO RELATED APPLICATION

This application is a continuation of U.S. Ser. No. 08/922,374, filed Sep. 3, 1997, now U.S. Pat. No. 5,860,752, which, in turn, is a division of U.S. Ser. No. 08/682,716, filed Sep. 23, 1996, now U.S. Pat. No. 5,795,086.

BACKGROUND OF THE INVENTION

1. Technical Field

The present invention relates to a tape printing device for printing one or more lines of input characters on strip-like tape.

2. Background Art

In the case of a conventional tape printing device for printing a title on the spine of a binder or on what is called a title label to be attached to a cassette for use in a VCR (VIDEO CASSETTE RECORDER) or in a VTR (VIDEO TAPE RECORDER), input characters entered by using keys or the like for inputting characters are printed on a side of tape, on the other side of which an adhesive layer is formed, by performing a thermal transfer printing or the like. Thereby, an objective printed tape is produced.

In the conventional tape printing device, operating elements (keys or buttons or the like) for entering information representing characters are placed on a console panel. Users can input a desired sequence of characters by operating these operating elements for entering information representing characters. Moreover, this conventional tape printing device is formed in such a manner that tape can be fed through a tape discharging slot by driving a tape feeding mechanism. Furthermore, a printing mechanism, which is constituted by a thermal print head, and a tape cutting mechanism are placed in series in this passage for tape.

When a print directing key is operated, a control means of the tape printing device controls and causes the tape feeding mechanism to feed the tape at a predetermined speed. The control means further controls and causes a print station to print preliminarily inputted characters on the fed tape. Moreover, upon completion of printing of a sequence of the characters, the control means of the tape printing device continuously controls and causes the tape feeding mechanism to feed the tape without printing characters (namely, perform a non-printing feeding operation on the tape) until a printed part of the tape goes out of the device. Thereafter, the control means causes the tape feeding mechanism to make the tape stop running.

Further, after the tape stops running, a user operates the tape cutting mechanism to thereby obtain a custom label, on which the sequence of desired characters are printed.

Meanwhile, a user sometimes inputs character strings erroneously to the tape printing device of such a kind and operates a printing operation element without being aware of an error. Further, the tape printing device of such a kind is adapted so that a user can freely designate the typefaces, sizes and arrangement of characters and so forth. However, a user sometimes causes the tape printing device to print characters without correcting attributes of characters, which have been erroneously designated. Further, sometimes, a user advertently operates the printing operation element halfway through a character inputting stage.

Upon occasion, a user is aware of such an error in the middle of a character printing operation. The conventional tape printing device, however, possesses the properties that a medium, on which characters are printed, is tape and that the number of characters to be printed is considerably small and a print time is short, in comparison with other kinds of character information processors (for example, what is called a word processor). Thus the conventional tape printing device does not have the function of stopping a printing operation. Therefore, when a user wishes to cease printing so as to effectively avoid wasting expensive tape, the user operates a power-supply operation element and turns off the power to thereby cease printing. Thereafter, the user turns on the power again and corrects the error. Subsequently, the user causes the device to perform a non-printing feed operation on tape and then print the correct characters again. Thus the user obtains a desired label.

However, such an operation of turning off the power and printing characters again in this way has the problem that if such an operation is not performed without errors, the tape is wasted.

As shown in FIG. 1(A), in the case of the conventional tape printing device, a thermal printing head 2 and a tape cutting mechanism 3 are placed in series on a tape transport passage on which tape T is moved by a tape feeding mechanism (not shown) in the direction of an arrow A (incidentally, an ink ribbon is omitted). Therefore, when the power is turned off and the printing operation is suspended, unfinished tape is left between the thermal printing head 2 and the tape cutting mechanism 3 (see FIG. 1(B)).

Thus, a label, on the leading part of which an unnecessary character is printed, is made if the power is then turned on and the printing operation is performed again without a non-printing feeding of the tape. Therefore, in the case that the power is turned off halfway through a printing operation, it is necessary to perform a non-printing feeding operation on tape and then cut the tape before the next printing operation is instructed. However, when a user wrongly operates a printing operation element in the tape printing device, a user may not perform a non-printing feeding operation on tape. Further, the user may turn off the power and leave the tape. In such a case, the user is required to cut a label, which is made by resuming a printing operation on the tape, namely, by arranging a character string, which has not been printed, at the head of a character string to subsequently be printed on the tape, at the front position of the label with scissors or the like.

Moreover, even in the case that the tape has been fed without printing characters or the like, if the amount of a fed part of tape is too small, an unnecessary character may be printed at the front position of the label (see FIG. 1(B)). Conversely, if too large, the tape is wasted by the amount of an excessively fed part thereof (see FIG. 1(C)).

Objects to be printed by the tape printing device are labels. Thus, in the case of printing a label by using the tape printing device, it is very frequent that a user requires the tape printing device to print mixed characters of various character sizes thereon, as compared with the case of making printed matter by using other kinds of character information processors. The tape printing device, therefore, have characters of various character sizes available. Moreover, the tape printing device is adapted so that the character size can be easily altered in a part of a character string to be printed. Such various character sizes include not only character sizes of characters represented by blocks of dots, in each of which the number of columns of dots is equal to that of rows of dots, but also other character sizes of characters, each of which is laterally shrunk. Thus, there are provided many kinds of the sizes of full-size characters. Further, the character size of a character can be easily changed among the sizes of full-size characters. Consequently, half-size characters are not available in the conventional tape printing device. When a user requests the conventional tape printing device to print a character of the size which is of the order of the half size, the tape printing device copes with such a request by using a smaller full-size character size.

Here, the half-size character is a character whose width is half the printing width of an ordinary character. Especially, in the case of kanji characters of Japanese and Chinese, the number of dots required for forming a kanji character is larger than that of dots required for forming a letter of the English alphabet. Thus, in the case of printing a numeric character that can be represented by dots of the number which is as small as that of dots required for representing a letter of the English alphabet, usually, both of a corresponding half-size numeric character, whose character width is half the character width of a kanji character, and a corresponding full-size numeric character, which represents a number by using dots of the same number as of dots required to represent a kanji character, are properly used.

Further, labels, which are printed matter made by using the tape printing device, are frequently used as those to be attached to the spine of a file cover, or to a cassette tape for use in AV equipment. In the case when put to such uses, character strings printed on labels often contain dates. Moreover, files and cassette tapes are often placed in longitudinal positions, respectively. Therefore, labels, on each of which characters are written and printed in such a manner that the characters are written longitudinally or vertically thereon, namely, in such a way that the direction of height of each of the characters is in agreement with the longitudinal or vertical direction of tape, are frequently attached thereto in longitudinal or vertical positions, respectively.

Thus, in the case that a character string contains Japanese characters "10月 23日" representing "October 23rd", if such a character string is printed in such a way that the direction of height of each of the characters is in agreement with the longitudinal direction of tape, a label printed with the characters "1", "0", "月", "2", "3" and "日", which are individually longitudinally or vertically written and are aligned in the longitudinal or vertical direction of the tape, is obtained. Consequently, when reading the printed character string, a user feels a strong sense of incongruity. Even if the size of the numeric characters contained in the character string representing the date are made to be smaller than that of the other characters, or even if the shrunken character size is selected as the size of the numeric characters, the characters "1", "0", "月", "2", "3" and "日" remain individually longitudinally or vertically written and aligned in the longitudinal or vertically direction of the tape. Thus, a user still feels a strong sense of incongruity when reading the character string.

It is not only in the case of longitudinally or vertically writing the characters that a user feels a sense of incongruity when reading the characters. Even in the case of laterally or horizontally writing the characters, when a plurality of numeric characters are aligned, a user sometimes feels a sense of incongruity. For example, in the case that Japanese characters "1234 番地" or the like contained in a character string representing an address are printed, the intervals, at which these numeric characters are written, sometimes appear to be too long.

Further, in the case of a label formed in the herein-above described manner, margins are provided in front of and behind a portion of a portion, on which the character string is printed, of tape in the longitudinal direction thereof by performing the aforementioned non-printing feeding operation on the tape. In the case of the conventional tape printing device, the length of such a margin is fixed. Actually, the tape used in the tape printing device is provided with release paper on the back surface thereof and is adapted so that when the release paper is peeled off, the tape can adhere to something. Moreover, the tape is adapted so that a thermal transfer of characters thereon can be achieved, and is enclosed in a tape cartridge. As a result, the tape has become expensive. Consequently, hitherto, the length of the margins has been fixed at a value that is set as short as possible.

The label, however, consists of a text portion and front, rear, top and bottom margins. Thus, if the length of, for example, the front and rear margins is set at a fixed value, a user cannot freely set the balance between the text portion and the space for the margins, so that a user sometimes is not satisfied with the set balance therebetween.

Thus, there has already been proposed a tape printing device adapted so that a user can designate the length of the front and rear margins from a plurality of kinds of values. However, some of tapes, which can be loaded into tape printing devices, have various kinds of tape widths. Even if the length of the margins is set in such a manner as to be most suitable for a tape having a certain width, this length of the margins is too long or too short for labels obtained by printing the characters on tapes having other tape widths. Therefore, every alteration of the tape to be loaded, it is necessary to perform an operation of changing the length of the margins. Thus, such a tape printing device is susceptible to improvement in operability thereof.

Further, a tape feeding mechanism entails a mechanistic operation and thus the power consumption thereof is large. As above described, the tape is expensive, so that when making a label, it is required that useless or wasteful parts of the tape are reduced as much as possible. Even in the case of the conventional tape printing device, a tape portion provided between a print head and a cutter mechanism is used as a front margin to be provided in front of the next text part to be printed. Thereby, the efficiency in using the tape, as well as the efficiency in consuming the power, is enhanced. However, in the case that for example, the length of the front margin is short, the tape portion provided between the print head and the cutter mechanism is wasted. Therefore, the aforementioned requirement is not fully satisfied.

Moreover, late or recent tape printing devices are adapted to deal with tapes of a large number of kinds of tape widths. Namely, the recent tape printing devices nearly satisfy user's requirements concerning the kinds of the tape width. It is, however, thought that a user needs a label whose width is wider than the widest width of the tapes used by the tape printing devices. Although a tape printing device may be configured in such a manner as to be able to deal with wider tape, it is considered from the viewpoint of cost-performance or the like as very disadvantageous to configure a tape printing device by taking a tape width, which is employed extremely rarely, into account.

Thus, there has been contrived an enlargement printing system whereby a pseudo label being equivalent to a label, which has a width being N times the width of tape loaded in the system and is printed with enlarged characters, is obtained by first dividing a tape, the printing of which is completed, into N sub-tapes aligned in the longitudinal direction of the tape, and by subsequently placing the N sub-tapes in such a manner as to adjoin in the direction of the width of the tape. For instance, as illustrated in FIG. 2(A), in the case of performing the enlargement printing by employing 2 times as a magnification or enlargement ratio, an upper half MU of an object such as a character string to be printed is first printed on a tape T. Then, a margin of a predetermined length is left thereon. Subsequently, a lower half MD of the object to be printed is printed thereon.

Incidentally, in the case of a tape printing device whose main purpose is to make a label, it is required to make a label readable easily by providing top and bottom margins arranged in the direction of the width of tape. Thus, when printing normally, the top and bottom margins are formed by setting the printable width of a print head at a value that is narrower than the width of tape loaded into the device. If the setting of the printable width of a print head at a value, which is narrower than the width of tape loaded into the device, is employed, it is unnecessary to alter a structure for driving the print head. Therefore, such a setting is preferable. In this case, as illustrated in FIG. 2(A), the top and bottom margins can be also formed when performing the enlargement printing.

After the tape T, on which the enlargement printing is completed as above described, is divided into a fore-tape-portion T1 and a hind-tape-portion T2 (see FIG. 2(B)), the top and bottom margins formed on each of the tape-portions T1 and T2 at the time of the enlargement printing are cut off therefrom. Then, these tape-portions T1 and T2 obtained by dividing the tape are placed side by side in the vertical direction as viewed in this figure. Thereby, a large label, whose width is wider than that of the tape, can be formed.

If, however, a dividing position is shifted from a predetermined position when dividing the tape T into the fore-tape-portion T1 and the hind-tape-portion T2, the front and rear edges of the upper tape-portion T1 are shifted from those of the lower tape-portion T2, respectively, in the case that these tape-portions are stuck to each other so that the text part of the tape-portion T1 is not shifted from that of the tape-portion T2 laterally. Further, in the case that the dividing position is shifted from the predetermined position, if the two tape-portions T1 and T2 are stuck to each other so that the front or rear edge of the tape-portion T1 is adjusted to the corresponding one of the front and rear edges of the tape-portion T2, the text part of the upper tape-portion is shifted from that of the lower tape-portion. Thus, a desirable label is not obtained. On the contrary, an awkward label is formed.

Furthermore, when removing the top and bottom margins, if these margins are not correctly cut and removed straight, a gap is formed between the upper text part and the lower text part (as illustrated in FIG. 2(C)). Alternatively, the upper text part and the lower text part are placed in such a manner as to overlap each other unnaturally.

Incidentally, as a device for making a rendering tape on condition that a printed part is transferred, there has already been proposed a device having an enlargement printing function (refer to the Japanese Patent Laying-Open (Kokai) No. 6-162256/1988 Official Gazette). In the case of making a rendering tape, even if the dividing position is shifted from the mid-point of the tape from which the two tape-portions are obtained, it is no problem because a printed part is transferred onto another sheet of paper or the like. Moreover, because of the condition that the printed part is transferred, it is unnecessary to form the top and bottom margins to be provided in the direction of the width of the tape, when printing. Therefore, there are not caused the aforementioned disadvantages of the tape printing device which aims mainly to the making of a label.

It is a first object of the present invention to provide a tape printing device which can form a label as a user desires, without wasting tape.

Further, it is a second object of the present invention to provide a tape printing device which can reduce a waste of tape even when stopping a printing operation, and can easily perform the subsequent operation.

Moreover, it is a third object of the present invention to provide a tape printing device which can increase the variety of manners of printing numeric characters, thereby obtaining a label on which a plural-digit number representing a date, an address and so on are printed in such a way as to cause a user to feel no sense of congruity.

Furthermore, it is a fourth object of the present invention to provide a tape printing device by which a user can easily obtain a label that has his desired margins.

Additionally, it is a fifth object of the present invention to provide a tape printing device which can be very highly efficient in using tape and can reduce the power consumption.

Besides, it is a sixth object of the present invention to provide a tape printing device which can form a large label, whose width is wider than the width of tape, easily and accurately by enlargement printing.

DISCLOSURE OF INVENTION

The first and second objects of the present invention are attained by a tape printing device provided with: storage means for storing character data inputted from input means; printing means for printing character data, which are sequentially read from the storage means, by means of a print head; tape feeding means for feeding tape to the print head and for moving printed tape toward an exterior of the print head; cutting means having a cutter for cutting tape discharged from the printing means; and control means for controlling a tape feeding operation and a printing operation, wherein the control means comprises: printing-operation stopping control portion for causing the printing means to stop a printing operation when a command for stopping a printing operation or a command for turning off a power supply is given from the input means during an inputted character or symbol is printed; and a non-printing feeding control portion for controlling and causing the tape feeding means to feed tape from a position thereof at the time of stopping a printing operation at least by a length of a tape conveying path from a position of a most recently printed character to the cutter.

The third object of the present invention is achieved by a tape printing device for printing one or more lines of input character strings on strip-like tape, which is provided with: (1/M)-scale reduced numeric-character input taking means (incidentally, M is an integer which is 2 or more) for taking in a (1/M)-scale reduced numeric-character input (to which a character width being equal to (1/M) of the width of other characters (having a full-size character attribute) of a character string to be printed is assigned); and printing means for printing contiguous M of (1/M)-scale reduced numeric characters by using a character size of a full-size character in case that a character string to be printed contains consecutive N occurrences of (1/M)-scale reduced numeric characters (incidentally, N is an integer which is 1 or more) and for printing (1/M)-scale reduced numeric characters, the number of which is not more than (M−1), by using the character size of a full-size character in case that the (1/M)-scale reduced numeric characters, the number of which is not more than (M−1), are left at the beginning or last part of a character string to be printed.

The fourth object of the present invention is attained by a tape printing device provided with set-margin-length taking means for taking in a kind of a designated value representing the length of each of margins provided in front of and behind a character string formed on a label; tape-width detecting means for detecting the width of loaded tape; and margin forming means for determining the length of each of the margins according to tape width information detected by the tape width detecting means in case that the kind of the designated value representing the length of each of the margins, which is taken in by the set-margin-length taking means, is an automatic determination kind for automatically determining the length of each of the margins according to the width of the loaded tape and for controlling and causing tape feeding means and a print head to form the margins, each of which has the determined length, on a label.

Further, the fourth object of the present invention is achieved similarly by a tape printing device provided with: square-array dot-pattern printing command taking means for taking in a command or instruction to print a square-array or matrix-like dot pattern consisting of intersections of cross-ruled lines of squared paper; and print control means for printing a character string and a square-array dot pattern over a region, which is wider than a character-string region, if the square-array dot-pattern printing command taking means takes in a command to print a square-array dot pattern when instructing to print a character string.

The first and fifth objects of the present invention are achieved by a tape printing device provided with: driving-pulse duration information holding means for holding information concerning a pulse duration of a driving signal to be applied to a print head when accelerating and decelerating a motor composing tape feeding means; and print control means for taking information, which concerns a pulse duration of a driving signal, out of the driving-pulse duration information holding means when a printing mode, in which a character string is printed, is designated at the time of accelerating and decelerating the motor, and for applying a driving pulse signal having the pulse duration to the print head.

The first and sixth objects of the present invention are attained by a tape printing device provided with: printing attribute designating means for designating an printing attribute corresponding to an input character string when performing a normal printing; enlargement printing command taking means for taking command information concerning an enlargement printing mode, in which a pseudo label, whose size is N times that of a label obtained by performing a normal printing, is obtained, when arranging tape-sections in the direction of the width of the tape in such a manner as to adjoin after dividing a tape, the printing of which is completed, into N tape-sections (incidentally, N is an integer which is not less than 2) in the longitudinal direction of the tape; printing-attribute determining means for determining a printing-attribute of each of N tape-sections, which are obtained by dividing the tape by N in the longitudinal direction of the tape, according to character and symbol data stored in storage means, a tape width detected by tape-width detecting means and the printing attribute designated by the printing attribute designating means; and printing means for serially printing N character-string-portions, into which a character string is divided in the direction of the width of the tape, on the tape according to the printing attributes determined by the printing-attribute determining means respectively corresponding to the tape-portions and for printing markers which indicate dividing positions in the longitudinal directions of the tape.

BRIEF DESCRIPTION OF DRAWINGS

FIGS. 14(A) to 14(D) are diagrams which illustrate tables for showing kinds of margins employed in a fourth embodiment of the present invention and procedures of setting margins therein;

FIG. 19 is a diagram for illustrating the relation between a margin length and a tape width in an "automatic" mode in the case of a fifth embodiment of the present invention;

FIG. 20 is a flowchart for illustrating a primary part of a printing operation of the fifth embodiment of the present invention;

FIG. 21 is a diagram illustrating the pulse durations of drive pulses for a print head when accelerating a tape/ribbon feeding motor of the fifth embodiment of the present invention and when decelerating the motor thereof;

BEST MODE FOR CARRYING OUT THE INVENTION

Figure 4:
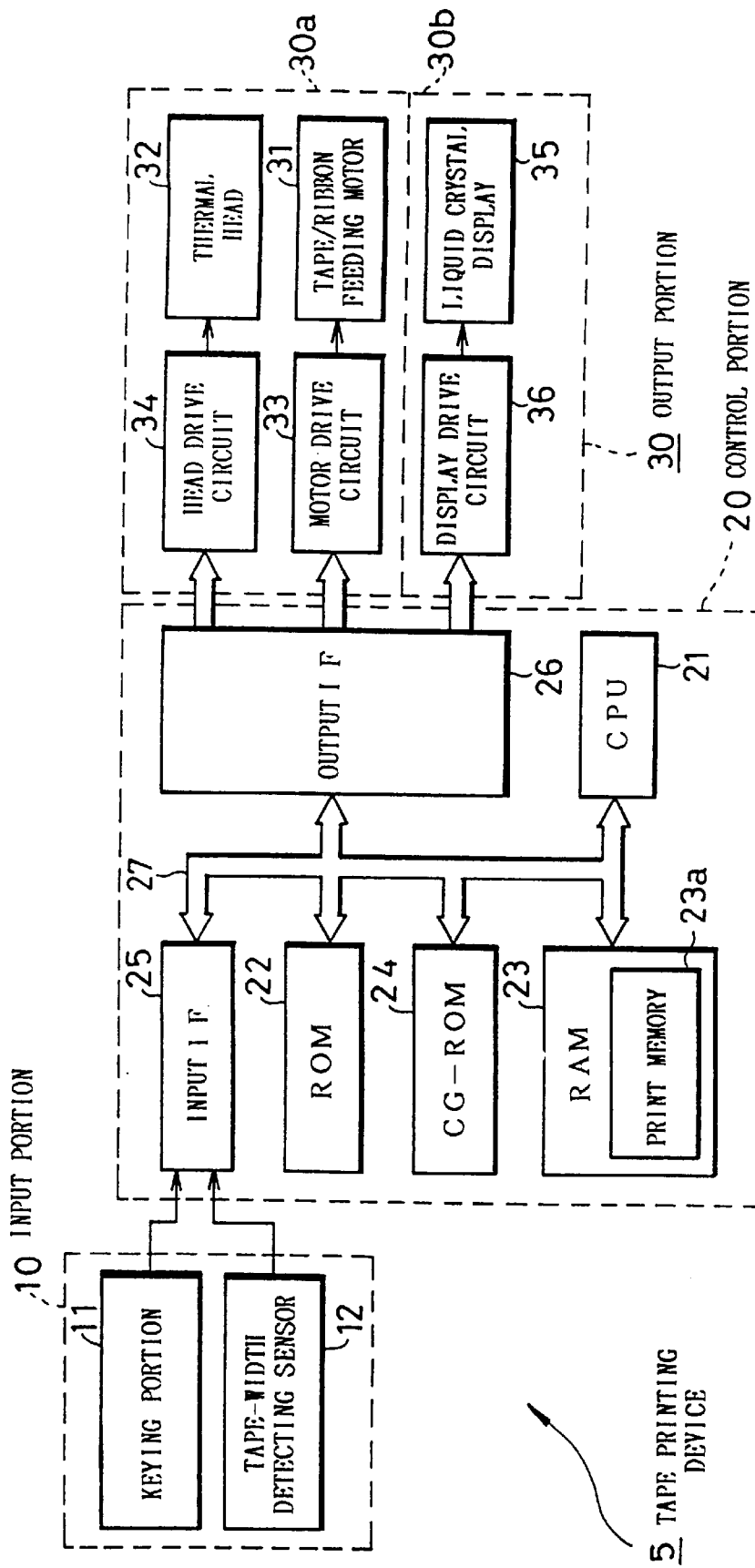
FIG. 4 is a block diagram for illustrating the configuration of an entire tape printing device embodying the present invention, namely, the first embodiment of the present invention.

Hereinafter, a tape printing device embodying the present invention, namely, a first embodiment (a best mode for carrying out the present invention) will be described in detail by appropriately referring to the accompanying drawings. FIG. 4 is a block diagram for showing the configuration of the entire tape printing device according to this embodiment of the present invention.

In the case of this tape printing device 5, various kinds of information necessary for printing is inputted to a control portion 20 through an input portion 10. Moreover, an output portion 30 is controlled by this control portion 20. Thus, input character strings or the like inputted from the input portion 10 are monitored. Furthermore, the input character strings are printed.

The input portion 10 is comprised of: a keying or key-operating portion 11 for detecting an operation performed by a user; and a tape-width detecting sensor 12 for detecting the width of tape. This key-operating portion 11 is provided with a plurality of operating elements for inputting characters, a print operating element, an operating element for feeding tape and so on. Further, the key-operating portion 11 outputs character codes, which represent characters, control codes, which represent typefaces or the like corresponding to characters, and a control code, which is used for printing, in response to operations of these operating elements. Thereby, in the tape printing device 5, the typefaces of characters and the spaces therebetween and so forth are set by operating this key-operating portion 11. Further, the tape printing device 5 is adapted so that character strings to be printed can be preliminarily inputted thereto and that subsequently, printing operations and so on can be started.

In the case of this embodiment, an operating element (to be described later) for stopping a printing operation is provided in the key-operating portion 11.

Figure 5:
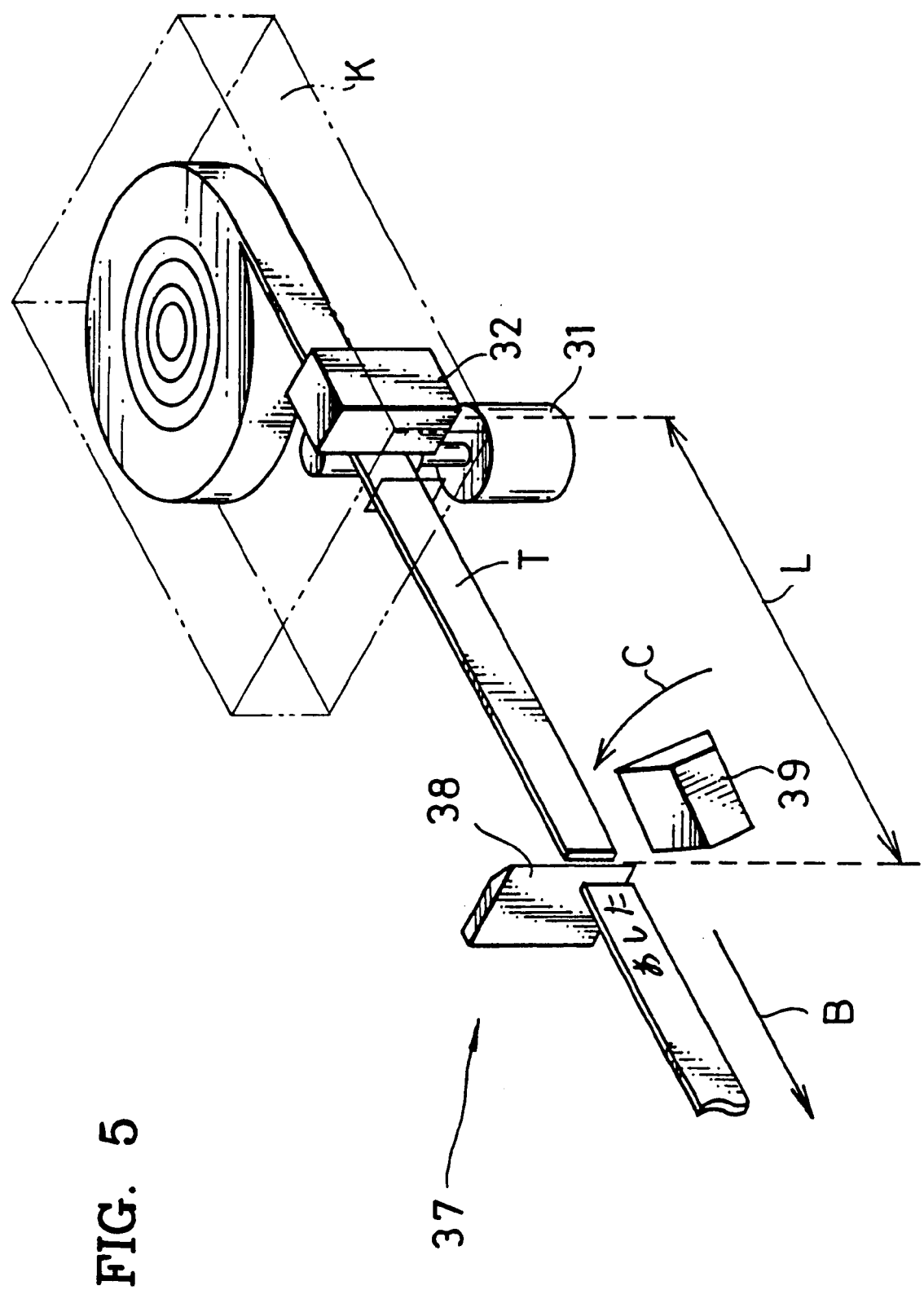
FIG. 5 is a perspective diagram for illustrating a printing mechanism of the first embodiment of the present invention.

The tape-width detecting sensor 12 is operative to detect physical discriminating or identification elements such as holes formed in a tape cartridge indicated by a character K in FIG. 5 and to output a result of such a detection to the control portion 20. Here, the tape cartridge holds tape by enclosing or accommodating the tape in a housing thereof. Further, in the case of this tape printing device 5, this tape cartridge is set at a predetermined storage position to thereby load the tape therein. Moreover, discriminating elements such as this hole is formed in the tape cartridge correspondingly to the width of the tape enclosed therein. The tape printing device 5 is further adapted so that the width of the loaded tape can be detected according to a result of such a detection and subsequently, the size and so forth of each character to be printed can be set correspondingly to the detected width of the tape.

The output portion 30 consists of a printing portion 30a and a display portion 30b for displaying character strings or the like inputted through the key-operating portion 11.

The printing portion 30a is composed of a tape feeding mechanism 31 and 33 for feeding the tape T enclosed in the tape cartridge K at a predetermined speed, and a printing mechanism 32 and 34 for printing input character strings.

Here, in the case of this embodiment, as is schematically illustrated in FIG. 5, the tape printing device is constructed so that the tape T is fed from the tape cartridge K at a prescribed speed, as indicated by an arrow B, by driving a tape/ribbon feeding motor 31 constituted by a stepping motor. Further, a thermal head 32 and a tape cutting mechanism 37 are placed serially on a path through which this tape T runs. The tape feeding mechanism consists of the tape/ribbon feeding motor 31, which is used for feeding forward this tape, and a motor drive circuit 33 for driving this tape/ribbon feeding motor 31. Incidentally, in FIG. 5, an ink-ribbon running structure, which is away from the features of this embodiment, is omitted.

The thermal head 32 is configured by placing a plurality of heating elements, the adjacent ones of which are close to each other, in a direction perpendicular to the longitudinal direction of the tape T. Further, the thermal transfer of ink of the ink ribbon, which is stored in this tape cartridge K aside from the tape, onto the tape is achieved by making each of the heating elements emit heat. Thereby, characters or the like are printed on the tape T. The printing mechanism is composed of this thermal head 32 and a head drive circuit 34 for driving the thermal head 32 in accordance with a control command sent from the control portion 20. Incidentally, in the case of this embodiment, the thermal head 32 is held by being inserted into a window formed in the tape cartridge K, so that the thermal head 32 pushes the tape T from the ink-ribbon side (not shown) thereof.

Thereby, the tape printing device 5 is adapted so that the tape T is supplied to the thermal head 32 at a predetermined speed by the tape feeding mechanism and moreover, the character strings or the like can be printed on the tape in sequence by driving the printing mechanism and that the tape P can be fed without being printed by driving only the tape feeding mechanism alone.

The tape cutting mechanism 37 is comprised of two kinds of cutters 38 and 39 and an operating element for cutting tape or the like, which is disposed on a console panel terminal portion. When pushing this operating element for cutting, the cutter 39 is turned in such a way as to intersect the cutter 38 fixed to a casing, as indicated by an arrow C. Thus, the tape T is cut by the cutters 38 and 39. Consequently, in the tape printing device 5, the tape T, the printing of which is completed, is cut off from the tape conveyed from the tape cartridge K by pushing this operating element for cutting. Further, a label is formed from the removed tape T. Incidentally, the tape cutting mechanism 37 may be adapted to automatically cut tape or the like under the control of the control portion 20.

The display portion 30b consists of a liquid crystal display 35, which is placed on the console panel, and a display drive circuit 36 for driving this liquid crystal display 35 according to a control command sent from the control portion 20. Thereby, the tape printing device 5 is adapted to be able to check the inputted character strings, the typeface or typestyle used to print the characters and the spaces therebetween through this liquid crystal display 35.

The control portion 20 is constituted by a micro-computer and is composed of a central processing unit (CPU) 21, a read-only memory (ROM) 22, a random access memory (RAM) 23, a character-generator ROM (CG-ROM) 24, an input interface (IF) 25 and an output interface (IF) 26 which are connected with each other through a system bus 27.

The input interface 25 is operative to output a control code or the like, which is inputted from the input portion 10, to the system bus 27 at a prescribed moment.

The CPU 21 performs a procedure, which is stored in the ROM 22, in response to the control code or the like, which is inputted through this system bus 27, to thereby control an operation of the entire tape printing device 5.

Figure 1A:
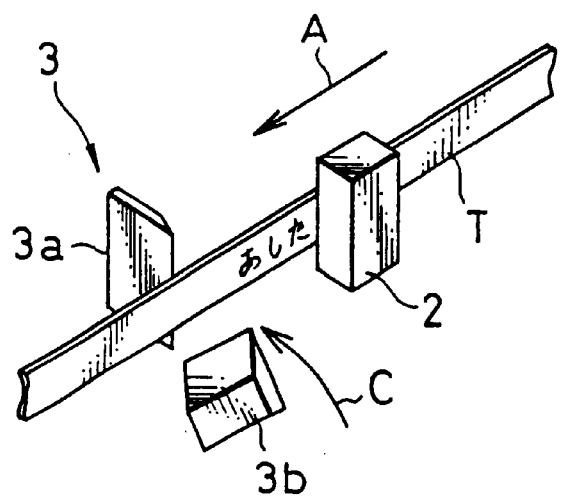
FIGS. 1(A), 1(B) and 1(C) are perspective views of a printing portion and a cutting portion, which are illustrated for illustrating the problems caused in the conventional tape printing device.
Figure 1B:
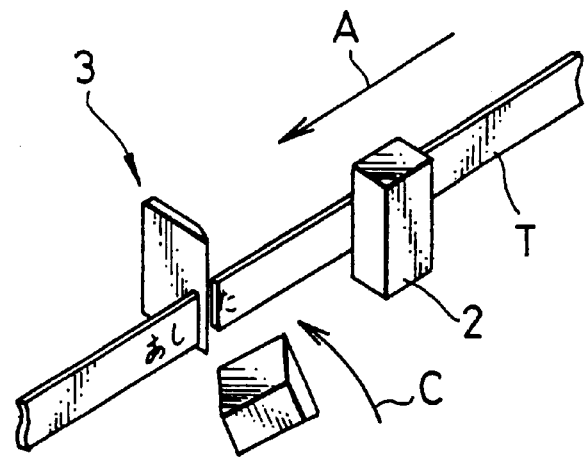
Figure 1C:
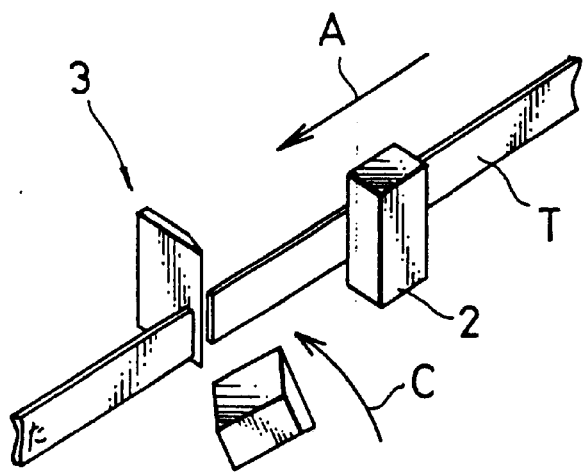
Figure 2A:
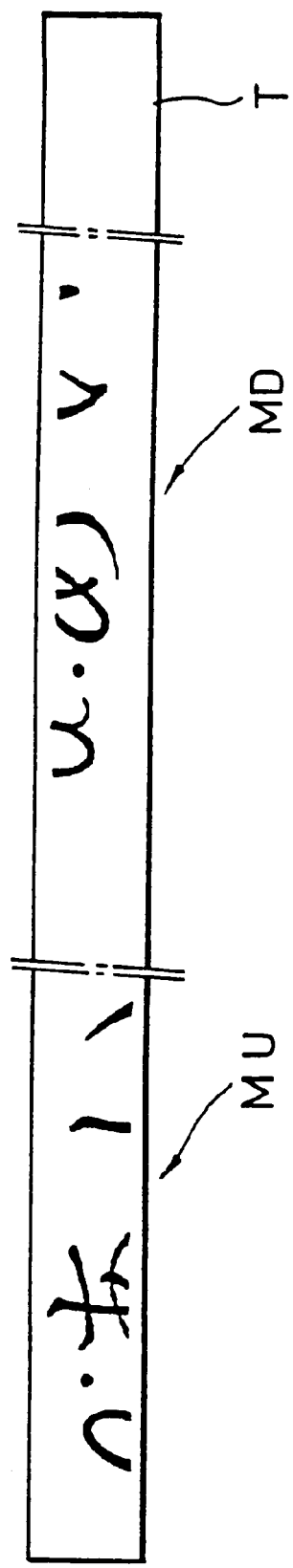
FIGS. 2(A), 2(B) and 2(C) are diagrams for illustrating a result of the enlargement printing, which are also illustrated for illustrating the problems caused in the conventional tape printing device.
Figure 2B:
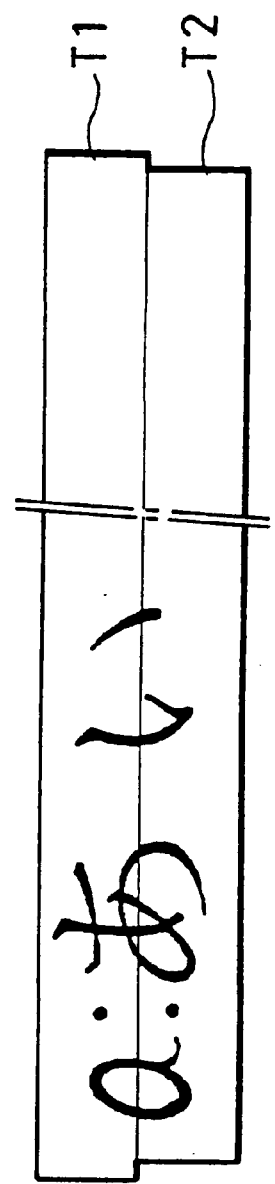
Figure 2C:
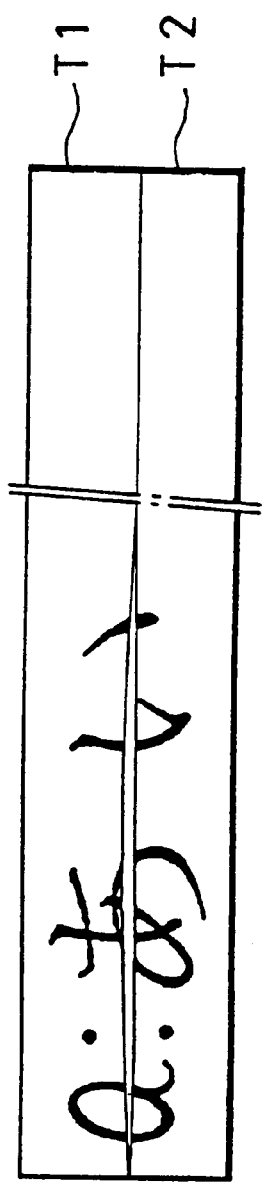
Figure 3:
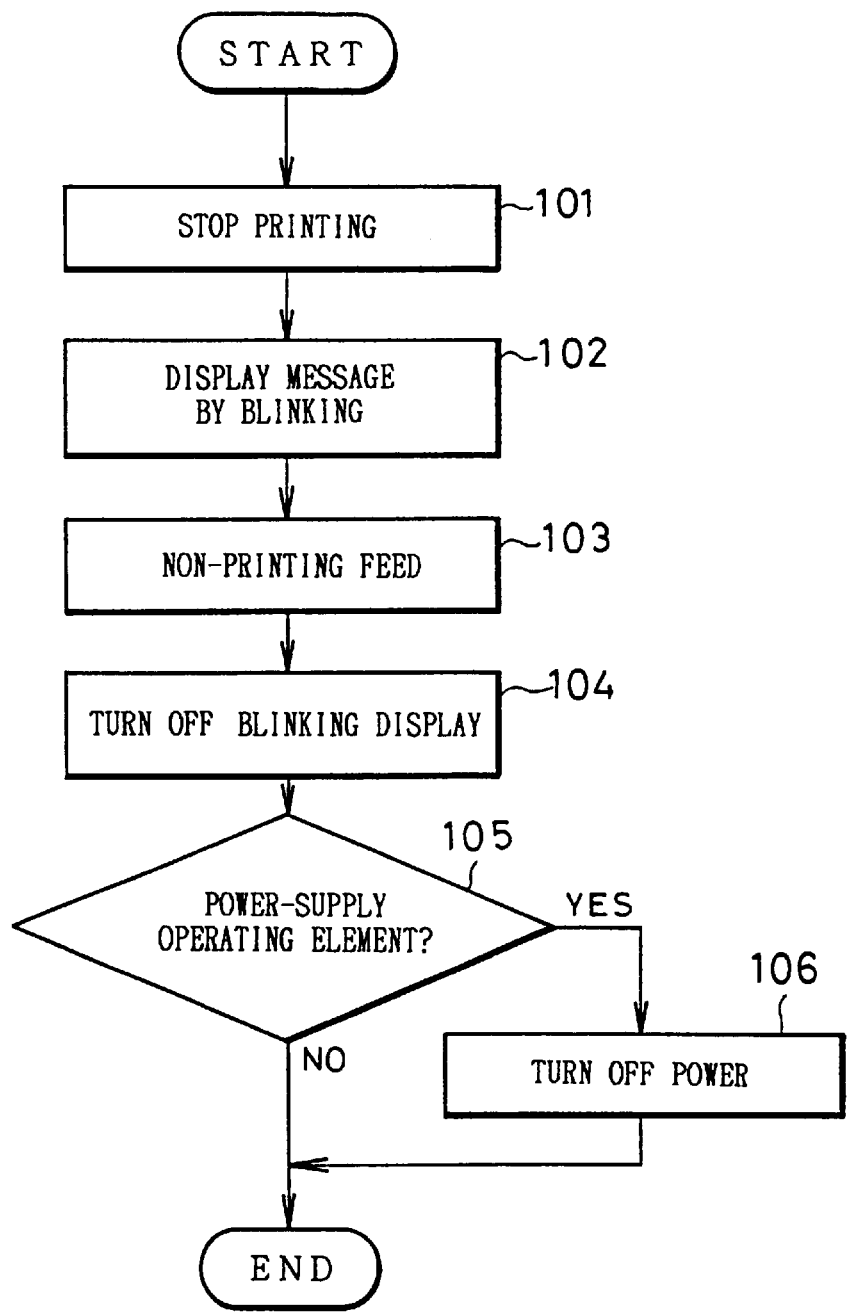
FIG. 3 is a flowchart for illustrating an interruption operation of a first embodiment of the present invention to be performed so as to stop printing.

Thus, processing programs to be executed by this CPU 21 are stored in the ROM 22. Moreover, kana-kanji translation dictionary data or the like is also stored in the ROM 22. Incidentally, a processing program for stopping a printing operation is also stored in the ROM 22 (see FIG. 3).

The RAM 23, in which a work area to be used by the CPU 21 is established, stores character strings or the like, which are inputted through the key-operating portion 11, and character strings, which are obtained by thereafter performing the kana-kanji translation, together with control codes in the form of character codes. Here, control codes stored in the RAM 23 represent the typeface or typestyle for printing and displaying characters and so on, the spaces between the characters, the sizes of the characters and so forth and are codes inherent in this tape printing device 5.

Hereunder, the kana-kanji translation will be described. In the case of Japanese character translation, some tape printing devices employ a two-stage translation system in which a combination of letters of the English alphabet is once translated into a combination of letters of "kana", namely, the Japanese alphabet, and next this "kana" is further translated into "kanji". This translation system is designated as "kana-kanji translation". Further, letters of "kana" are inputted correspondingly to the pronunciation of letters of "kanji". In the case that input keys respectively correspond to letters of the English alphabet (namely, Roman letters), input codes corresponding to the Roman letters are translated into "kana" character codes which are further translated into "kanji" character codes through the kana-kanji translation.

In the RAM 23, a certain area is assigned to a print memory 23a. In the case of the tape printing device 5, this print memory 23a is used as a buffer memory for printing.

The character-generator ROM 24 stores font information, which concerns characters and symbols to be printed and displayed in this tape printing device 5, therein. In the case of this embodiment, information concerning bit-map fonts and outline fonts is stored therein as this font information.

The output interface 26 is controlled by the CPU 21 and outputs the font information, which is stored in the character-generator ROM 24, and control codes, which are issued from the CPU 21, to the output portion 30.

Thereby, the CPU 21 accesses the character-generator ROM 24 according to character codes and control codes, which are stored in the RAM 23, and causes the liquid crystal display 35 to display the character strings that are inputted by a user.

Further, when detecting through the input interface 25 that the print operating element is operated by being pushed, the CPU 21 similarly accesses the character-generator ROM 24 after a control command for starting a printing operation is issued to the head drive circuit 34 and the motor drive circuit 33. Moreover, the CPU 21 then outputs data, which has been outputted from the character-generator ROM 24, to the head drive circuit 34 in a prescribed order. At that time, the CPU 21 changes addresses used for writing information to and reading information from the print memory 23 by causing the memory 23a to output the font information, after the font information outputted from the character-generator ROM 24 is once stored in this print memory 23a. Thus, the size, the orientation and so forth of characters to be printed are changed.

Thereby, the CPU 21 has the character string, which has been displayed on the liquid crystal display 35, printed on the tape T sequentially in the format as a user desires. Further, upon completion of printing the character string, the CPU 21 drives the motor drive circuit 33. Thereafter, the CPU 21 controls and causes the motor drive circuit 33 to stop the motor. Consequently, the tape T is fed without being printed. Thus, the printing operation is finished.

Therefore, in the case of this tape printing device 5, when a user performs a simple operation of only pushing the print operating element after inputting a desired character string by operating the key-operating portion 11 while monitoring the liquid crystal display 5, tape printed with the input character string is outputted to the tape cutting mechanism 37. Upon completion of feeding out the tape, the tape cutting mechanism is caused to act, when the user performs pushing the operating element for cutting. Thus, the tape is cut, so that a label is formed.

If the operating element for stopping the printing operation or the power-supply operating element is operated halfway through the printing of the character string, the input interface 25 causes an interruption to the CPU 21. At that time, the CPU 21 performs the procedure of FIG. 3 in response to this interruption.

Incidentally, a dedicated operating element may be provided as the operating element for stopping the printing operation. However, in the case of this embodiment, a general purpose operating element is used by taking the efficient arrangement of the console panel into consideration. For example, a print operating element, a deletion operating element or an cancellation operating element are used. Here, the print operating element is an operating element which relates to a printing operation. It is, therefore, preferable that the print operating element is used for stopping a printing operation, because a user can easily recognize the functions of this operating element. Further, the deletion operating element has the function of deleting a file or the like. Moreover, a cancellation operating element (which is also used as the deletion operating element in some tape printing device) is an operating element has the function of canceling or erasing input characters. Both of these operating elements have the function of canceling the operation performed in the past. Thus, such a function and the function of stopping a printing operation, by which the printing operation performed in the past is canceled, have a common point. Therefore, the deletion operating element and the cancellation operating element can easily be remembered as the operating element for stopping a printing operation. Consequently, the deletion operating element and the cancellation operating element are suited to the operating element for stopping a printing operation.

When starting an interruption for stopping a printing operation, the CPU 21 first sends out a control command to the head drive circuit 34 in step 101. Thus, the printing of a character string is stopped. Consequently, when a user notices an occurrence of an error and pushing the operating element for stopping the printing operation or the power-supply operating element, the printing operation is immediately stopped, so that the wasteful consumption of tape is effectively avoided. Incidentally, there has already been proposed a tape printing device adapted to manage the number of times of printing a character string. In the case of such a tape printing device, when the printing operation is forcefully terminated halfway in step 101, data representing the number of times of printing the character string is held therein.

Subsequently, the CPU 21 advances to step 102, whereupon the CPU 21 causes the liquid crystal display 35 to display a message "stop a printing operation !" by blinking the message. Thereby, in the liquid crystal display 35, even a user, who is unaccustomed to the operation, can ascertain through this liquid crystal display 35 that an intended operation is performed.

Thereafter, the CPU 21 advances to step 103 whereupon the CPU 21 sends out a control command, by which an operation is stopped, to the motor drive circuit 33 when a prescribed time of a timer, which has started clocking, elapses. Consequently, the tape T is fed forward by a prescribed amount without being printed. Here, note that when normally printing, the non-printing feeding is performed so as to secure an unprinted space area, which has a length selected by a user, posterior to a printed character string, whereas the non-printing feeding to be performed after stopping a printing operation in this embodiment is carried out by a distance L between the position of the printing portion of the thermal head 32 (namely, the position at which the heating elements are placed) and the cutting position at which tape is cut by the cutters 38 and 39 (see FIG. 5).

The tape printing device of this embodiment is configured so that when the operating element for cutting is pushed by a user after finishing the non-printing feeding, the tape T can be cut at the rear end of the printed part of the character string, the printing of which is stopped. Therefore, even when a user does not perform the feeding of the tape, the tape can be cut in such a manner that a waste of the tape is minimized. Namely, even when a user, who is unaccustomed to the operating of the tape printing device 5 of such a type, operates the device, the wasteful consumption of the tape T can be reduced without performing the complex operation after stopping the printing operation.

When the non-printing feeding of the tape T is performed in this way, the CPU 21 subsequently advances to step 104 whereupon the blinking display of the message "stop a printing operation !" is turned off. Then, the CPU 21 advances to the next step 105 whereupon it is judged whether or not the operated operating element is the power-supply operating element.

Here, in the case that an interruption is generated by a user's operation of the power-supply operating element, the CPU 21 advances to step 106 whereupon the power supply is turned off. Thus, this procedure is finished. In contrast, in the case that an interruption is caused by operating the operating element for stopping a printing operation, the procedure of the interruption is immediately finished and the device waits for the subsequent operation of the operating element because a user wishes to continue to operate this tape printing device 5.

In the device having the aforementioned configuration, a character string preliminarily inputted through the key-operating portion 11 is stored in the form of a character code in the RAM 23 together with a control code. If the print operating element is operated during the device is in this state, the tape T is supplied to the thermal head 32 at the predetermined speed by means of the tape/ribbon feeding motor 31. Further, the font information is outputted from the character-generator ROM 24 to the head drive circuit 34 through the print memory 23a according to the character code and the control code stored in the RAM 23. Thus, the preliminarily input character string is printed on the tape. If the operating element for stopping the printing operation or the power-supply operating element is operated halfway through the printing operation, the printing by using the thermal head 32 is controlled in such a manner as to be stopped. Thereafter, the message for stopping a printing operation is displayed by being blinked. Further, the tape T is fed by the distance L between the thermal head 32 and the cutting position at which the cutting operation is performed by the cutters 38 and 39. Moreover, in the case that the power-supply operating element is operated, the power supply is subsequently turned off. The operation is finished. In contrast, in the case that the operating element for stopping the printing operation is performed, the subsequent operation of the operating element is waited for after the non-printing feeding of the tape is performed.

In accordance with the embodiment described hereinabove, in the case that the operating element for stopping a printing operation or the power-supply operating element is operated, the printing operation is immediately stopped. Thereafter, the tape is fed by the distance between the thermal head and the cutting position at which the tape is cut by the cutters, without being printed. Thereby, the tape can be held by performing the non-printing feeding of the tape so that the waste of the tape is minimized. Consequently, the waste of the tape can be reduced by simplifying the complex operation.

Further, in accordance with the aforementioned embodiment, the device is adapted so that the message for stopping the printing operation is displayed. Thereby, a user can know that the tape printing device accepts a command for stopping the printing operation. Consequently, the operability of the tape printing device can be enhanced.

Moreover, in accordance with the aforementioned embodiment, a general purpose operating element, whose assigned function of stopping a printing operation is easily remembered by a user, is employed as the operating element for stopping a printing operation. Thereby, the efficiency in placing the operating element can be increased. Moreover, the operability of the tape printing device can be enhanced.

Incidentally, regarding the aforementioned embodiment, the case, in which the tape T is fed without being printed by the distance L between the thermal head 32 and the cutting position where the tape T is cut by the cutters, has been described. The present invention, however, is not limited to such a case. In all cases other than the case of stopping or ceasing a printing operation, the wasteful consumption of the tape in the subsequent printing operation can be effectively avoided by feeding the tape T at least by the distance L between the thermal head 32 and the cutting position where the tape T is cut by the cutters 38 and 39 after the last character is printed. Thereby, the wasteful consumption of the tape can be reduced.

Further, regarding the aforementioned embodiment, the case, in which a printing operation is stopped by operating the general purpose operating element or the power-supply operating element halfway through the printing operation, has been described. The present invention, however, is not limited to such a case. A dedicated operating element may be placed as the operating element for stopping a printing operation.

Moreover, as to the aforementioned embodiment, the case, in which the tape is cut by manually pushing the operating element for cutting, has been described. The present invention, however, is not limited to such a case. The present invention can be widely applied to cases that the tape is cut by using a motor or the like. In such a case, the operability of the tape printing device can be enhanced by cutting the tape after a printing operation is stopped after the tape printing operation is stopped and then the tape is fed without being printed.

Furthermore, as to the aforementioned embodiment, there has been described the tape printing device that is adapted to feed the tape T by the distance L between the thermal head 32 and the cutting position, at which the tape T is cut by the cutters 38 and 39, without being printed when stopping the printing operation. However, the distance, by which the tape is fed without being printed in the case of instructing to stop the printing operation during a rear feeding operation for making a rear or right margin, may be smaller than that in the case of the aforementioned embodiment. In short, it has only to feed the tape, without being printed, even after the issuance of the command, by which a printing operation is stopped, so that the position of the last printed character reaches the cutting position at which the tape is cut by the cutters 38 and 39 and from which the cut part of the tape is discharged.

Next, another tape printing device embodying the present invention, namely, a second embodiment of the present invention will be described hereinbelow.

First, the electrical configuration of the entire tape printing device, namely, the second embodiment will be described by referring to a functional block diagram of FIG. 7.

Figure 7:
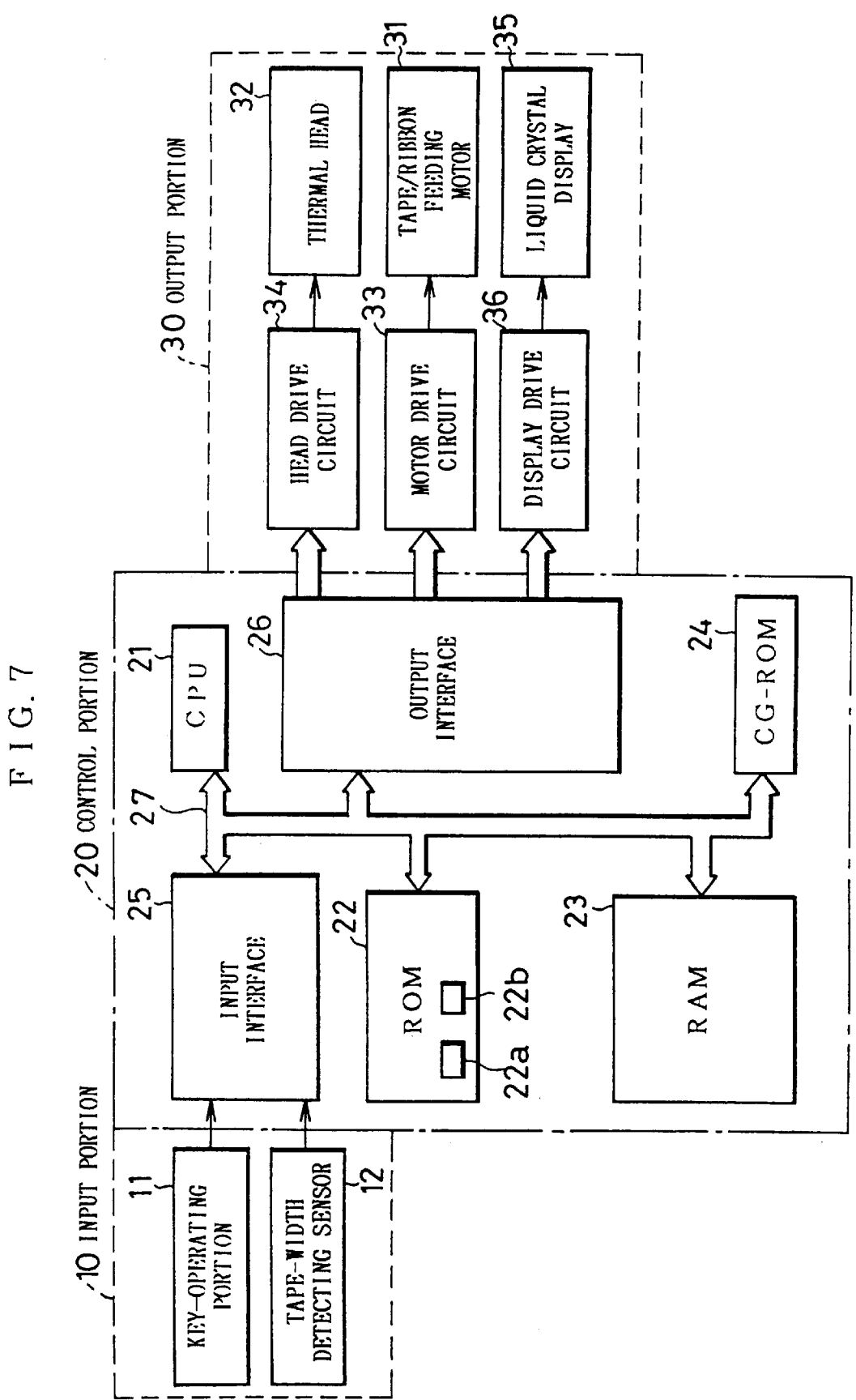
FIG. 7 is a block diagram for illustrating the configuration of an entire tape printing device embodying the present invention, namely, the second embodiment of the present invention.

The differences between the configuration of FIG. 7 and that of the first embodiment of FIG. 4 are a part of processing programs and data, which are stored in the ROM 22. In the ROM 22 of this second embodiment, various kinds of processing programs and inalterable data such as kana-kanji translation dictionary data are stored.

The processing programs and the inalterable data, which are peculiar to the second embodiment, and the data stored in the RAM 23 will be described later in detail. Incidentally, in the ROM 22, a processing program 22a for taking in input characters and a development program 22b to be executed when printing characters, which will be described later, are stored. Further, when executing these programs 22a and 22b, a work area therefor is suitably established in the RAM 23. The remaining composing elements of this embodiment are the same as of FIG. 4. Thus, the descriptions of such composing elements are omitted.

This embodiment provides support for half-size numeric-characters (namely, (½)-scale reduced numeric-characters), the combination of two of which has a size that is equal to the size of an ordinary character. Hereinafter, a half-size numeric-characters input taking operation and another half-size numeric-character development operation will be described in this order by referring to FIGS. 6(A) and 6(B).

Figure 6A:
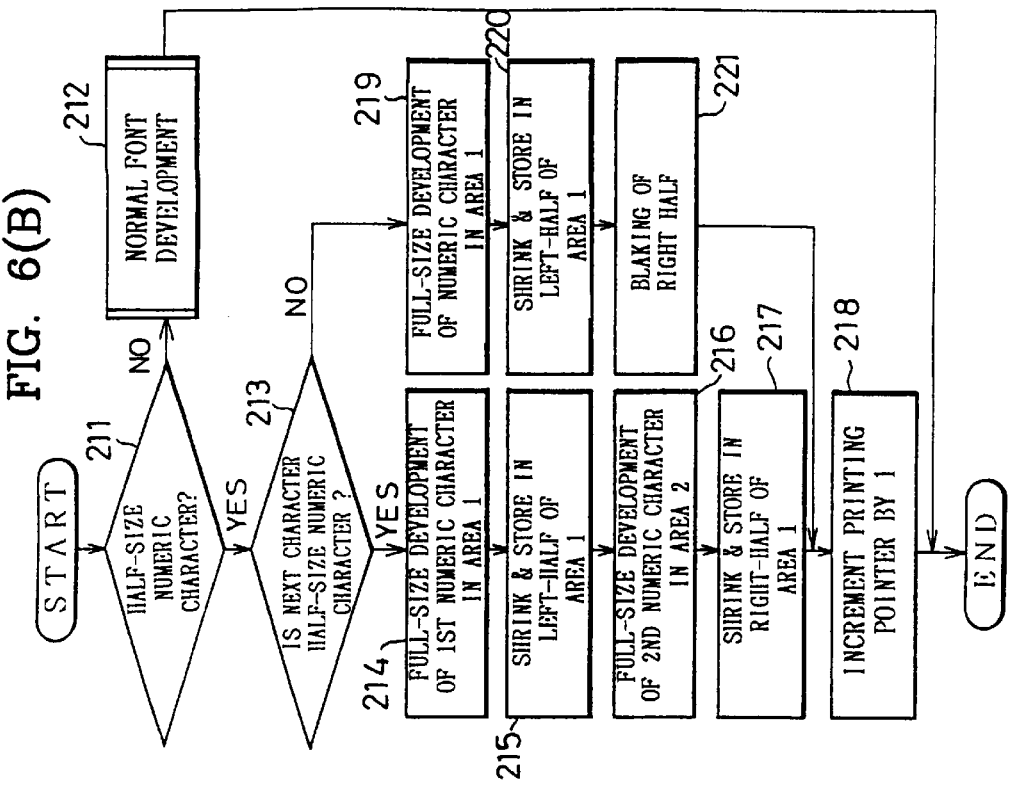
FIGS. 6(A) and 6(B) are flowcharts which respectively illustrate a half-size numeric-character input taking operation and a printing operation to be performed in a second embodiment of the present invention.

FIG. 6(A) is a flowchart for illustrating a half-size numeric-character input taking operation. In the case of this embodiment, half-size numeric-characters are available as symbols. When operating a key for designating a symbol input (for example, a key dedicated to the symbol input) is operated, the CPU 21 starts executing the processing program 22a of FIG. 6(A) stored in the ROM 22.

Incidentally, in the case of this embodiment, half-size numeric characters respectively representing numbers "0" to "9" are available as half-size numeric characters to be inputted.

Further, first, the CPU 21 causes the liquid crystal display 35 in step 201 to display initial candidates for kinds of symbols. The kinds of available symbols are, for instance, symbols suitable for VTR cassettes, unit symbols, descriptive symbols, living-thing symbols, vehicle symbols and mathematical-expression symbols. In the case of this embodiment, as above described, the half-size numeric characters are available as symbols of a kind. Among these kinds of symbols, the kinds of symbols, which have a highest frequency of use, or the kinds thereof, which are selected by a learning function just before displayed, are displayed as the initial candidates. Incidentally, if the display device is adapted to display a plurality of kinds of symbols at a time, a cursor is positioned at a current candidate and is then blinked thereat.

Thereafter, the CPU 21 judges in step 202 whether a selection key or an alteration key (for example, a cursor moving key) is operated. When the alteration key is operated, the current candidate for the kind of symbols is changed in step 203. The CPU 21 then returns to step 202.

When the selection key is operated in a condition in which a certain kind of symbols is the current candidate, the CPU 21 advances from step 202 to step 204 whereupon the CPU 21 judges what the selected kind of symbols is. If a kind of symbols other than the half-size numeric-characters is selected, the CPU 21 goes to step 205 whereupon a symbol selection process of selecting a symbol among symbols of the selected kind is performed by executing a routine of a processing program.

Figure 8A:
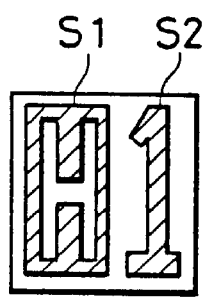
FIGS. 8(A) and 8(B) are diagrams for illustrating a half-size character displaying method to be performed in the second embodiment of the present invention.
Figure 8B:
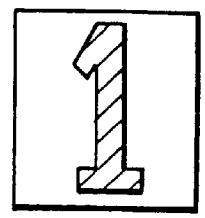

In contrast, if the selected kind of symbols is the half-size numeric character, the CPU 21 advances to step 206 whereupon one of the half-size numeric characters is displayed on the screen of the liquid crystal display 35 as an initial current candidate. In the case of this embodiment, a half-size numeric character is displayed by using an area for displaying one ordinary character. For example, as illustrated in FIG. 8(A), a combination symbol obtained by the combination of a dot pattern S1, which indicates that the displayed character is a half-size numeric character, and another hatched dot pattern S2, which indicates the displayed number itself, is displayed by using an area having a size of one ordinary character. Thus, the half-size numeric character is displayed in a manner different from the representation of a numeric character having a character width which is equal to the width of an ordinary kanji-character as illustrated in FIG. 8(B). Naturally, fonts as shown in FIG. 8(A) are provided in the CG-ROM 24.

When causing the liquid crystal display to indicate the half-size numeric character which is the current candidate, the CPU 21 advances to step 207 whereupon the CPU 21 judges whether the selection key or the alteration key (for example, the cursor moving key) is operated. When the alteration key is operated, the current candidate for the half-size numeric character is changed in step 208. The CPU 21 then returns to aforementioned step 207.

When the selection key is operated in a condition in which a certain half-size numeric character is the current candidate, the CPU 21 advances from step 207 to step 209 whereupon the CPU 21 judges that the half-size numeric character, which is the current candidate, is definitely selected. Further, the CPU 21 causes the RAM 23 to store a code representing this half-size numeric character at a location in an input character-string buffer area, which is subsequent to the location where the last one of character codes stored heretofore in this buffer area. Moreover, a display buffer area is also operated, so that a display image is returned to a character input screen image at the stage where a symbol key is operated. Furthermore, a dot pattern, which prescribes the sellected half-size numeric character and is as illustrated in FIG. 8(A), is displayed at a character input position designated by the cursor when the symbol key is pushed down. Then, the CPU 21 finishes the process consisting of a sequence of these steps. If a kind of symbols other than the half-size numeric-characters is selected, the CPU 21 goes to step 205 whereupon a symbol selection process of selecting a symbol among symbols of the selected kind is performed by executing a routine of a processing program.

Here, note that in the case of this embodiment, a code representing a half-size numeric character is not the combination of a code, which indicates a half-size, and a code indicating a number and that a code represented by bits of the number, which is equal to that of other ordinary character code, indicating a half-size numeric character. For instance, in the case that numbers "1", "0", "2" and "3" contained in the character string "10 23" are represented by half-size numeric characters, respectively, the characters of this character string are represented by "EC61", "EC60", "8C8E", "EC62", "EC63" and "93FA" in hexadecimal representation, respectively. Thereby, the fonts for displaying half-size numeric characters can easily be fetched from the CG-ROM 24.

Incidentally, although the description is omitted, the symbol selection operation can be canceled halfway through the symbol selection operation by depressing the cancellation key.

As above described, in the case of this embodiment, it is necessary for a user to select a half-size numeric character from the symbols every time when a half-size numeric character is inputted. Therefore, when inputting an N-digit half-size numeric character, a user requires performing an operation of selecting this numeric character from the symbols N times.

Meanwhile, the following methods have been devised as a method for designating a half-size numeric character. Namely, one of such methods comprises the step of providing a key for designating a half-size mode in the device, and the step of thereafter taking in numeric characters, which are inputted during this key is depressed two times, as half-size numeric characters (incidentally, this method is another embodiment). Further, another method is to take in numeric characters indicated between a numeric character, at which the cursor is positioned when the key for designating a half-size mode is first depressed in the case of depressing this key two times, and another numeric character at which the cursor is positioned when the key for designating the half-size mode is depressed for a second time, as half-size numeric characters (incidentally, this method is still another embodiment). However, in the case of this first embodiment of the present invention, half-size numeric characters are selected from the symbols as above described, for the following reasons.

The tape printing device has a diversity of character sizes. Thus, the tape printing device can deal with a demand for reduction in size of letters of the alphabet or the like by selecting a character size. Therefore, in the case of this embodiment, the half-size (numeric) characters are applied only to numeric characters. This limitation on the number of half-size characters obviates the necessity of provision of a large number of symbols, even if a half-size numeric character is selected from symbols. Further, the configuration of the tape printing device, which includes the CD-ROM 24 and so on, becomes hardly complex. Moreover, in the case of employing the aforementioned latter selection method, the tape printing device should be provided with a new processing routine which is not provided in the conventional tape printing device. However, from the viewpoint of effective utilization of memory capacity of the ROM 22, it is not efficient to provide the new input processing routine in the device for handling a small number of half-size characters. In contrast, in the case of employing the method of selecting a half-size numeric character from symbols, there is no necessity of providing a new processing program. Further, the tape printing device can cope with the demand or problem by altering only a part of the symbol selection processing program.

In the case of this embodiment, a single half-size numeric character is displayed on the screen of the liquid crystal display 35 in such a manner as to have the same size as of a single full-size character as illustrated in FIG. 8(A), for the following reason. Namely, the displaying of a half-size numeric character in such a way as to have the size which is equal to that of a single full-size character, can be easily achieved, because it has only to utilize the fonts stored in the ROM 24. In contrast, if two half-size numeric characters are displayed in such a manner as to have the size, which is equal to that of a single full-size character (incidentally, such a method is yet another embodiment), the tape printing device is required to perform computations therefor. Thus, the process to be performed in the device becomes complex. In addition, a displaying position, at which the character is displayed, should be changed with progress in the input operation. It is inefficient to perform the operation of displaying two half-size numeric characters in such a way as to have the size, which is equal to that of a single full-size character, every change in the displaying position.

Next, the development of each character during the printing thereof (incidentally, such a development operation naturally includes a development of a half-size numeric character) will be described hereinafter by referring to FIG. 6(B).

Character development at the time of printing is carried out by iteratively performing the development of each of the characters of a character string. FIG. 6(B) is a flowchart for illustrating the development of each of the characters to be performed repeatedly. Incidentally, in the case of printing characters on tape in such a manner that the characters are written longitudinally or vertically thereon, namely, in such a way that the direction of height of each of the characters is in agreement with the longitudinal or vertical direction of tape, the following two methods may be employed. Namely, one of these methods includes the step of turning or rotating the font (namely, the corresponding dot pattern) outputted from the CG-ROM 24 when performing the development. The other method includes the step of storing the font (namely, the dot pattern), which is outputted from the CG-ROM 24, without being turned, and the step of thereafter reading the font (namely, the dot pattern) by turning or rotating the font (namely, the dot pattern) when driving the thermal head 32. The development of each character during the printing thereof will be described hereinbelow on the premise that the latter method is employed for printing characters on tape in such a manner that the characters are written longitudinally or vertically thereon. Namely, the development itself is similarly performed in both cases that characters are longitudinally or vertically written on tape and that characters are transversely or horizontally written thereon.

Figure 6B:
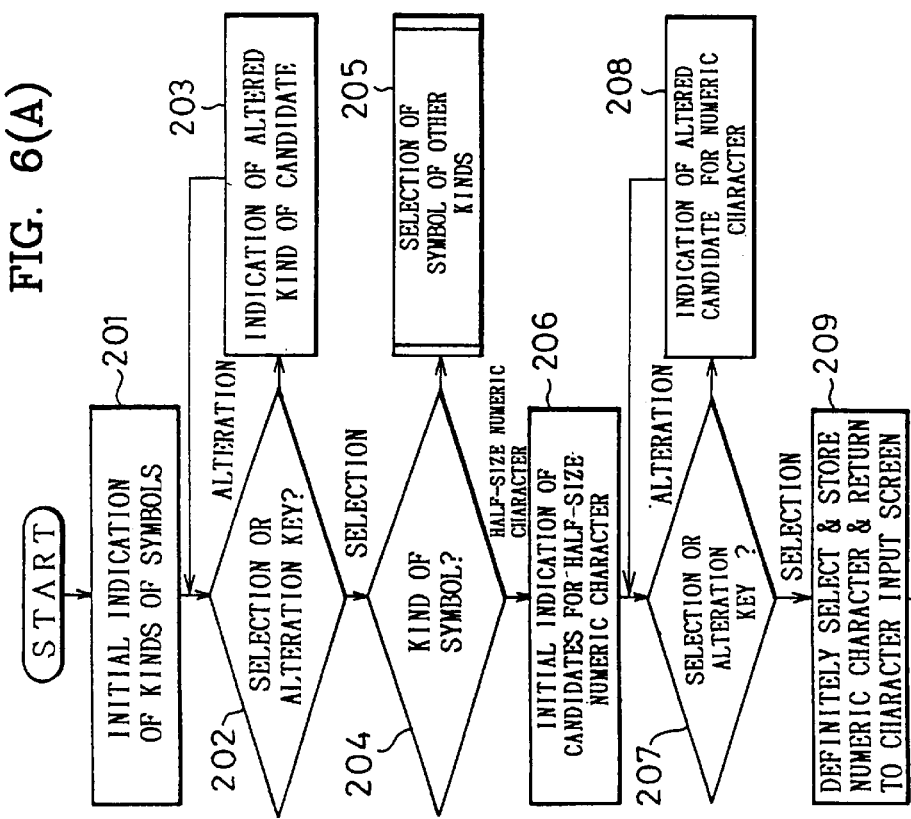

When the CPU 21 starts performing the process of FIG. 6(B), it is first judged in step 211 whether or not a character to be developed this time is a half-size numeric character. If not, the CPU 21 performs a process, which is similar to the conventional development process, in step 212, and then the development of the character to be developed is finished.

In contrast, if the character to be developed this time is a half-size numeric character, the CPU 21 judges in step 213 whether or not the next character to be developed is a half-size numeric character.

Figure 9A:
FIGS. 9(A) to 9(D) are diagrams for illustrating the flow of a development processing of half-size numeric-characters to be performed in the second embodiment of the present invention when printing.
Figure 9B:
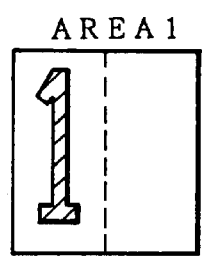

If so, the CPU 21 advances to step 214 whereupon the font (namely, the dot pattern) corresponding to a full-size numeric character, which represents the same number as represented by the first one of the consecutive two half-size numeric characters, is read from the CG-ROM 24 and is developed in a font development area (hereunder referred to as an area 1) indicated by a printing pointer. The character size of each of the numeric characters is determined according to the attributes of the character string to be printed. Further, the correspondence table representing the correspondence relation between each half-size numeric character and a corresponding full-size numeric character is preliminarily stored in, for instance, the ROM 22. This table is utilized in the process to be performed in step 214. FIG. 9(A) illustrates the development operation to be performed in step 214. Subsequently, the CPU 21 shrinks or compresses the developed font to half (namely, ½) thereof only in the lateral direction in step 215. Further, the shrunken font is stored in the left-side half of the area 1 as viewed in this figure. FIG. 9(B) illustrates the shrinking/storage operation performed in step 215.

A method of performing the logical OR, namely, the logical sum between 2 dots adjoining in the lateral direction according to an equation given below is employed as a method of compressing the developed font to half (namely, ½) thereof only in the lateral direction.

$$D_{new}(X_n, Y_m) = D_{old}(X_{2n}, Y_m) + D_{old}(X_{2n-1}, Y_m)$$

Figure 9C:
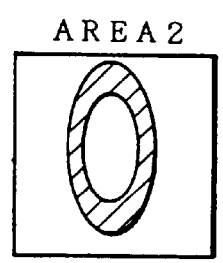
Figure 9D:
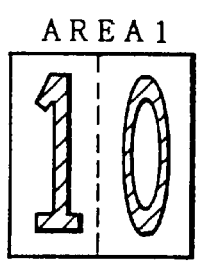

Next, the CPU 21 advances to step 216 whereupon the font (namely, the dot pattern) corresponding to a full-size numeric character, which represents the same number as represented by the second one of the consecutive two half-size numeric characters, is read from the CG-ROM 24 and is developed in an unused font development area (hereunder referred to as an area 2, and for example, an area subsequent to the area indicated by the printing pointer). FIG. 9(C) illustrates the development operation to be performed in step 216. Subsequently, the CPU 21 shrinks or compresses the developed font to half (namely, ½) thereof only in the lateral direction in step 217. Further, the shrunken font is stored in the right-side half of the area 1 as viewed in this figure. FIG. 9(D) illustrates the shrinking/ storage operation performed in step 217.

On the other hand, if the character to be developed this time is a half-size numeric character but the character to be developed next time is other than a half-size numeric character, the CPU 21 advances to step 219 whereupon the font corresponding to a full-size numeric character, which represents the same number as represented by the first one of the consecutive two half-size numeric characters, is read from the CG-ROM 24 and is developed in the font development area 1 indicated by the printing pointer. Thereafter, the CPU 21 shrinks or compresses the developed font to half thereof only in the lateral direction in step 220. Further, the shrunken font is stored in the left-side half of the area 1 as viewed in this figure. Further, the blanking of the right-half of the area 1 is performed in step 221.

Upon completion of dot development in the area 1 designated by the printing pointer, which is performed as above described, the CPU 21 finishes a sequence of the development operations performed on the character to be developed this time by incrementing the printing pointer by 1 in step 218.

Figure 10A:
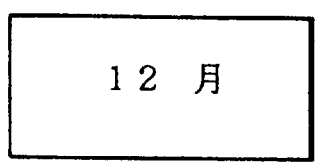
FIGS. 10(A) and 10(B) are diagrams for illustrating examples of printed half-size numeric-characters in the case of the second embodiment of the present invention.
Figure 10B:
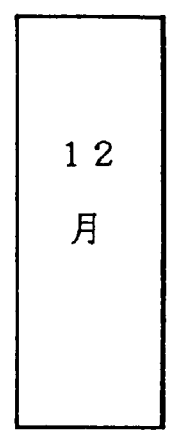

In the case of printing information concerning the font developed by performing such a development operation, if, for example, two half-size characters are contained in the character string to be printed, a label, on which two half-size numeric characters are printed in such a manner as to have the size being equal to that of an ordinary character, is obtained as illustrated in FIGS. 10(A) and 10(B). Incidentally, FIG. 10(A) illustrate the case in which the characters are written laterally or horizontally on the tape; and FIG. 10(B) the case in which the characters are written longitudinally or vertically thereon.

As above described, in the case of this embodiment, only the fonts for printing full-size numeric characters are preliminarily stored in the CG-ROM 24. Further, the tape printing device deals with half-size numeric characters by performing the shrinking or compressing operation. Even in the case of the conventional tape printing device, for the purpose of increasing the variety of character sizes, compressed character sizes for treating a font corresponding to a ceratin character size as a full-size character are available. Further, such a compressing operation can be applied to the generation of fonts corresponding to half-size numeric characters in this embodiment.

In the foregoing description, the development operation, which is different from the development performed in the conventional tape printing device, has been described. Other kinds of processing or operations to be performed when printing, which becomes different from that performed in the conventional device as a result of employing half-size numeric characters, are operations of determining a tape length, a character size and so forth, which depend on the number of characters (incidentally, the flowcharts for illustrating these operations are omitted). In the case of consecutive N half-size numeric characters, the number of characters is determined as follows. Namely, in the case that N is even, the number of characters is (N/2). However, in the case that N is odd, the number of characters is an integer obtained by raising (N/2).

The aforementioned second embodiment is adapted so that input half-size numeric characters can be accepted and printed. Thereby, there is realized a tape printing device which can increase the variety of the manners of printing numeric characters, and which can provide a label printed with plural-digit numeric characters which cause users to feel no sense of congruity.

In the foregoing description, modifications of the second embodiment have been described. However, other modifications of the second embodiment can be described hereinbelow.

In the case of the aforementioned second embodiment, the numbers "0" to "9" are available as half-size numeric characters and symbols which can be selected as input characters. Further, the tape printing device may be adapted so that symbols corresponding to two-digit half-size numeric characters such as "00" to "99" can be used.

In the case of the aforementioned second embodiment, only full-size fonts are available as numeric-character fonts for printing. However, the tape printing device may be adapted so that fonts corresponding to half-size numeric characters are available. In this case, this tape printing device may be further adapted so that symbols corresponding to two-digit half-size numeric characters such as "00" to "99" can be used. Consequently, the capacity of the CG-ROM 24 may be increased, whereas it can be expected that the development operation is achieved at a high speed.

Moreover, in the case of the second embodiment, when an odd number of consecutive half-size numeric characters are contained in an input character string, the last one of the half-size numeric characters is printed in such a manner as to have a character size of a half-size character. However, the last one of the half-size numeric characters may be printed in such a way as to have a character size of a full-size character. Further, when an odd number of consecutive half-size numeric characters are contained in an input character string, the first one of these consecutive half-size numeric characters may be printed independent of the remaining ones thereof. Moreover, each pair of adjacent half-size numeric characters may be printed in such a manner as to have the character size of a full-size character.

Next, yet another tape printing device embodying the present invention, namely, a third embodiment of the present invention will be described hereinbelow. Although the second embodiment can deal with (½)-scale reduced numeric characters (namely, half-size numeric characters) as the printable reduced numeric characters, this third embodiment can cope with a plurality of kinds of reduced numeric characters. Namely, in the case of the third embodiment of the present invention, not only half-size numeric characters, whose reduction ratio is (½), but also half-size numeric characters, whose reduction ratio are (⅓) . . . (1/J), are available as (1/M)-scale reduced numeric characters, M of which can be concurrently printed in such a way as to have a size being equal to that of an ordinary full-size character.

The configuration of the entire third embodiment is nearly the same as that of the entire second embodiment and thus is not shown in the drawing.

Further, the reduced-numeric-character input taking operation of the third embodiment is almost the same as that of the second embodiment (see FIG. 6(A)) but is different from that of the second embodiment in the following respects.

In the case of this third embodiment, the reduced numeric characters are provided as symbols. When operating the key for indicating symbol input (for example, a key dedicated to the symbol input), the CPU 21 starts executing a processing program for taking in symbols, which is stored in the ROM 22 (see FIG. 6(A)). Incidentally, in the case of this embodiment, reduced numeric characters, whose reduction ratio is each of (½), (⅓), . . . , (1/J), corresponding to the numbers "0" to "9", respectively, are provided therein.

Figure 11A:
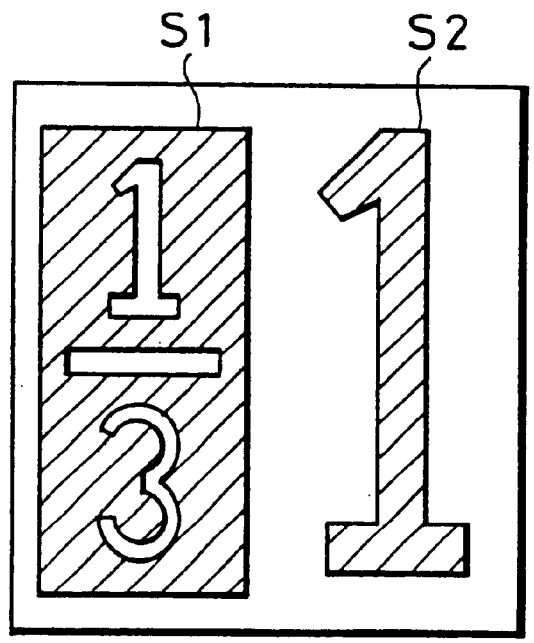
FIGS. 11(A) and 11(B) are diagrams for illustrating a method of displaying (1/M)-scale reduced half-size numeric-characters in the case of a third embodiment of the present invention.
Figure 11B:
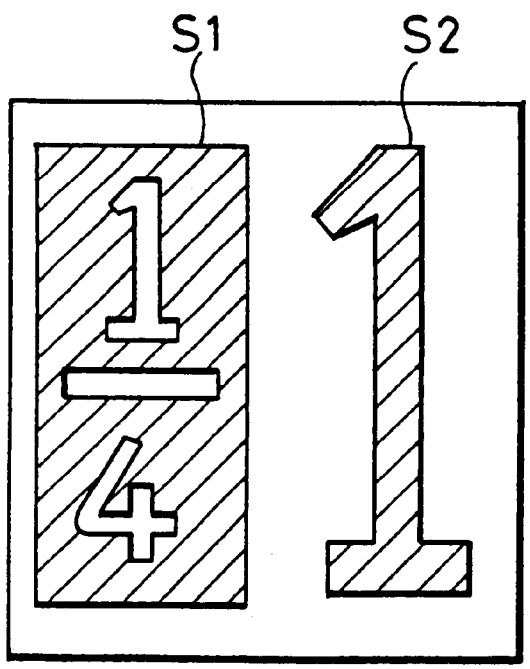

Further, the CPU 21 first causes the liquid crystal display 35 to indicate an initial candidate for the kinds of symbols. When operating the alteration key, a current candidate for the kinds of symbols is changed. Moreover, when the selection key is operated in a condition in which a certain kind of symbols is the current candidate, the CPU 21 discriminates the selected kind of symbols (see steps 201 to 204). If a kind of symbols other than the (1/M)-scale reduced numeric-characters (incidentally, M is 2, . . . , or J), the CPU 21 performs a symbol selection operation of selecting one of symbols of the selected kind (see step 205). In contrast, if the selected kind of symbols is the (1/M)-scale reduced numeric character, the CPU 21 causes the liquid crystal display 35 to display one of the (1/M)-scale reduced numeric characters as an initial current candidate (see step 206). In the case of this embodiment, a (1/M)-scale reduced numeric character is displayed by using an area for displaying a character. For instance, as shown in FIGS. 11(A) and 11(B), a combination symbol obtained by combining a dot pattern S1, which indicates that the selected symbol is a (1/M)-scale reduced numeric character, with a hatched dot pattern S2, which represents a number itself, is displayed in a manner, which is different from the representation of a numeric character having a width which is equal to the width of an ordinary kanji character, in such a way as to have a size of one character. Naturally, in the CG-ROM 24, there are provided fonts as illustrated in FIGS. 11(A) and 11(B).

When causing the liquid crystal display to indicate the (1/M)-scale reduced numeric character which is the current candidate, the CPU 21 judges whether the selection key or the alteration key is operated. When the alteration key is operated, the current candidate for the (1/M)-scale reduced half-size numeric character is changed. When the selection key is operated in a condition in which a certain (1/M)-scale reduced half-size numeric character is the current candidate, the CPU 21 judges that the half-size numeric character, which is the current candidate, is definitely selected. Further, the CPU 21 causes the RAM 23 to store a code representing this (1/M)-scale reduced half-size numeric character at a location in an input character-string buffer area, which is subsequent to the location where the last one of character codes stored heretofore in this buffer area. Moreover, a display buffer area is also operated, so that a display image is returned to a character input screen image at the stage where the symbol key is operated. Furthermore, a dot pattern as illustrated in FIGS. 11(A) and 11(B), which prescribes the selected (1/M)-scale reduced numeric character, is displayed at a character input position designated by the cursor when the symbol key is pushed down. Then, the CPU 21 finishes the process consisting of a sequence of these steps (see steps 207 to 209).

In the case of this embodiment, a code representing a (1/M)-scale reduced numeric character is not the combination of a code, which indicates a (1/M)-scale, and a code indicating a number and that a code represented by bits of the number, which is equal to that of other ordinary character code, indicating a (1/M)-scale numeric character. Thereby, the fonts for displaying (1/M)-scale reduced numeric characters can easily be fetched from the CG-ROM 24.

Next, the development of each character during the printing thereof (incidentally, such a development operation naturally includes a development of a (1/J)scale reduced numeric character) will be described hereinafter by referring to FIG. 12.

Character development at the time of printing is carried out by iteratively performing the development of each of the characters of a character string. FIG. 12 is a flowchart for illustrating the development of each of the characters to be performed repeatedly. Incidentally, in the case of printing characters on tape in such a manner that the characters are written longitudinally or vertically thereon, namely, in such a way that the direction of height of each of the characters is in agreement with the longitudinal or vertical direction of tape, the following two methods may be employed. Namely, one of these methods includes the step of turning or rotating the font (namely, the corresponding dot pattern) outputted from the CG-ROM 24 when performing the development. The other method includes the step of storing the font (namely, the dot pattern), which is outputted from the CG-ROM 24, without being rotated, and the step of thereafter reading the font by turning or rotating the font when driving the thermal head 32. The development of each character during the printing thereof will be described hereinbelow on the premise that the latter method is employed for printing characters on tape in such a manner that the characters are written longitudinally or vertically thereon. Namely, the development itself is similarly performed in both cases that characters are longitudinally or vertically written on tape and that characters are transversely or horizontally written thereon.

Figure 12:
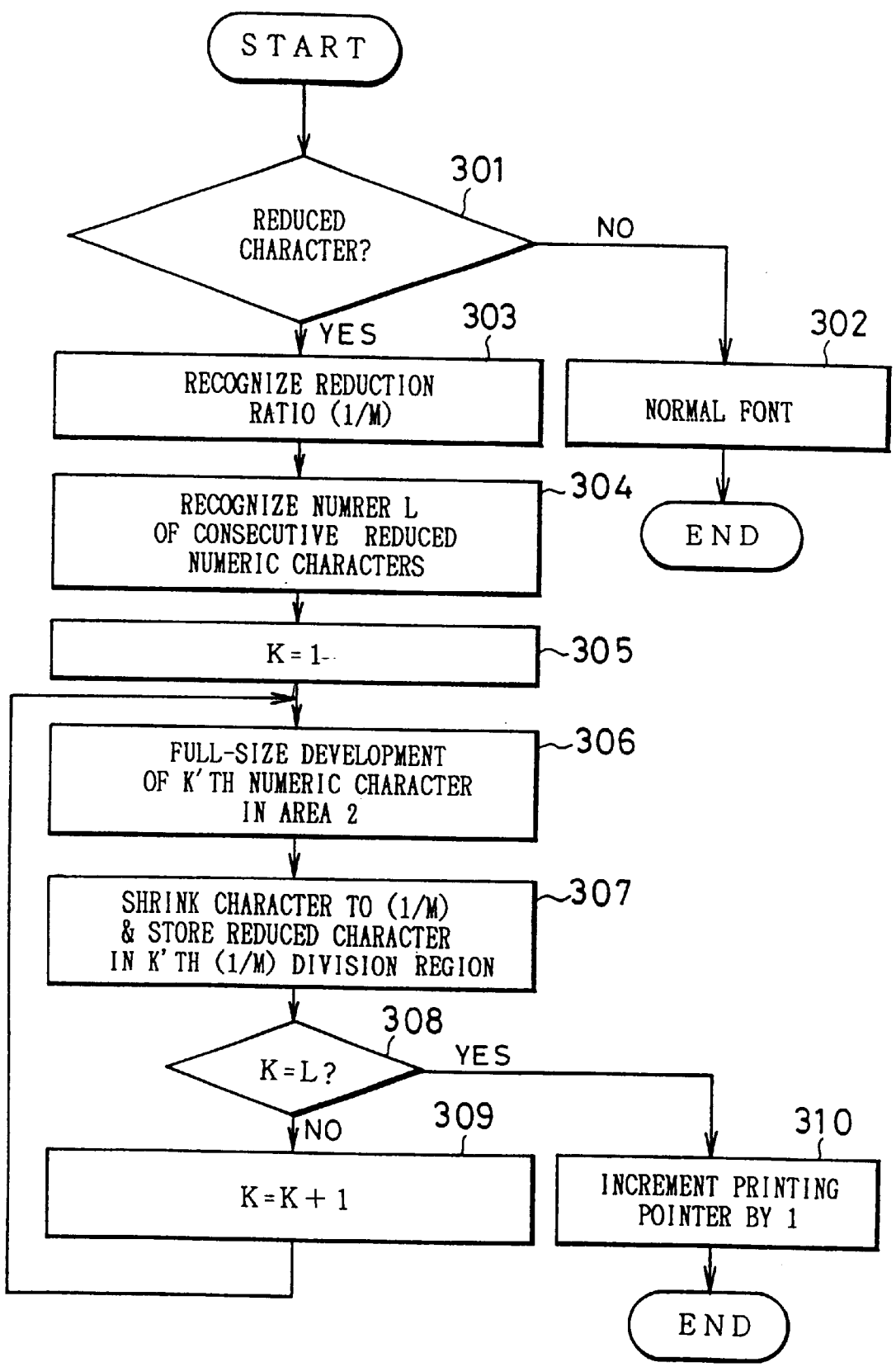
FIG. 12 is a flowchart for illustrating a font development processing to be performed when printing in the third embodiment of the present invention.

When the CPU 21 starts performing the process of FIG. 12, it is first judged in step 301 whether or not a character to be developed this time is a reduced numeric character. If not, the CPU 21 performs a process, which is similar to the conventional development process, in step 302, and then the development of the character to be developed is finished.

In contrast, if the character to be developed this time is a reduced numeric character, the CPU 21 recognizes the reduction ratio (1/M) in step 304. Thereafter, in step 304, the CPU 21 recognizes how many reduced numeric characters including the reduced numeric character to be developed this time are consecutive (L in this case). Incidentally, the upper limit set on the recognized number L of consecutive characters is the reciprocal number M of the reduction ratio (1/M) recognized in step 301. Namely, $L \leq M$.

Next, the CPU 21 sets a parameter K for prescribing which of the consecutive L characters a reduced numeric character in question is, at a value of 1 in step 305. Then, the CPU 21 advances to step 306 whereupon the font (namely, the dot pattern) corresponding to a full-size numeric character, which represents the same number as represented by Kth one of the consecutive reduced numeric characters, is read from the CG-ROM 24 and is developed in an unused font development area (hereunder referred to as an area 2, for example, an area subsequent to a font development area (hereunder referred to as an area 1) indicated by a printing pointer) independently of the area 1. It is assumed that the character size in this case is determined according to the attributes of the character string to be printed. Further, the correspondence table representing the correspondence relation between each (1/M)-scale reduced numeric character and a corresponding full-size numeric character is preliminarily stored in, for instance, the ROM 22. This table is utilized in the process to be performed in step 306.

Subsequently, the CPU 21 shrinks or compresses the developed font stored in the area 2 to (1/M) thereof only in the lateral direction in step 305. Further, the shrunken font is stored in the Kth (1/M)-division-region of the area 1 as viewed in this figure. A method of performing the logical OR, namely, the logical sum between 2 dots adjoining in the lateral direction according to an equation given below is employed as a method of compressing the developed font to (1/M) thereof only in the lateral direction.

$$D_{new}(X_n, Y_m) = D_{old}(X_{Mn-(M-1)}, Y_m) + D_{old}(X_{Mn-(M-2)}, Y_m) \ldots + D_{old}(X_{Mn-1}, Y_m) + D_{old}(X_{Mn}, Y_m)$$

Thereafter, the CPU 21 judges in step 308 from a comparison between the current value of the parameter K and the number L of the consecutive reduced numeric characters whether or not the development operation performed on the last one of the consecutive L (1/M)-scale reduced numeric characters is finished. If finished, the parameter K is incremented by 1 in step 309. Then, the CPU 21 returns to the aforementioned step 306.

Upon completion of the dot development of L consecutive (1/M)-scale reduced numeric characters in the area 1 designated by the printing pointer, which is performed by repeatedly carrying out the processing loop consisting of steps 306 to 309, an affirmative result is obtained in step 308. Then, the CPU 21 finishes a sequence of the development operations performed on the character to be developed this time by incrementing the printing pointer by 1 in step 310.

Figure 13A:
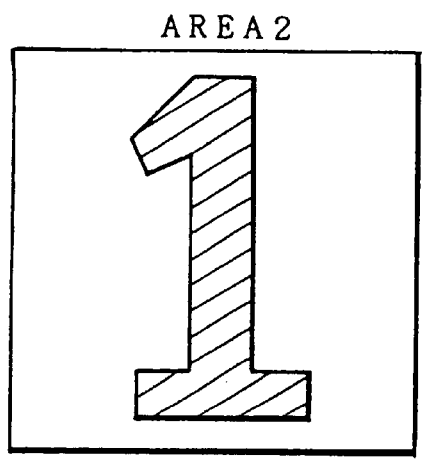
FIGS. 13(A) to 13(F) are diagrams for illustrating the flow of a development processing of (1/M)-scale reduced half-size numeric-characters to be performed in the third embodiment of the present invention when printing.
Figure 13B:
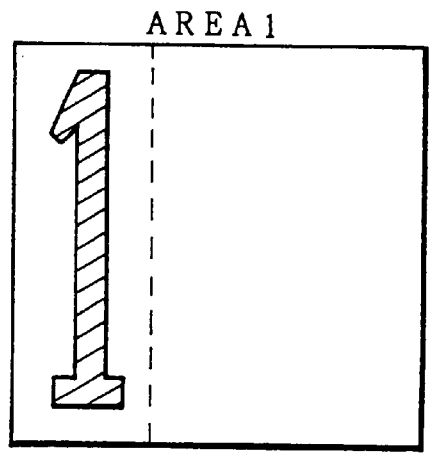
Figure 13C:
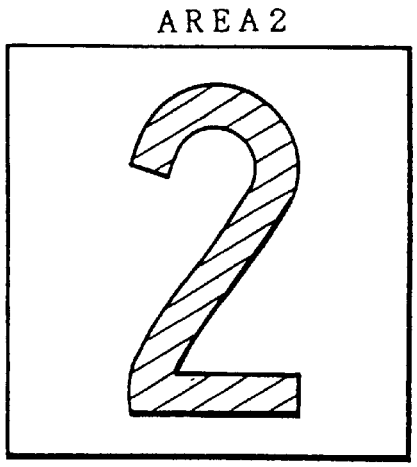
Figure 13D:
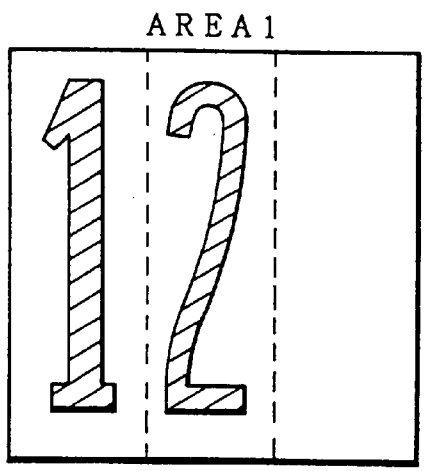
Figure 13E:
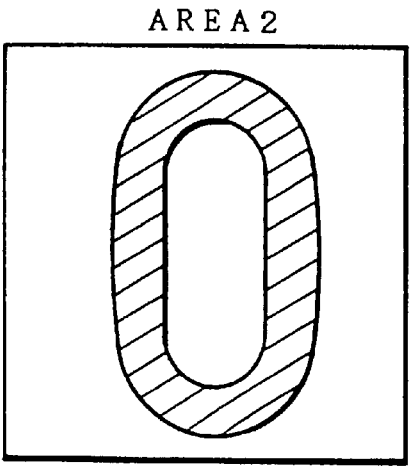
Figure 13F:
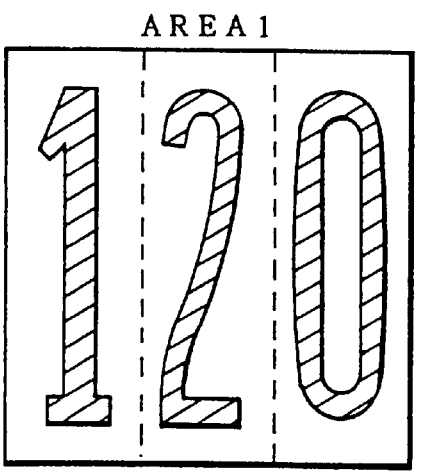

FIGS. 13(A) to 13(F) are diagrams for showing changes in the area 1 and the area 2 in time sequence during the dot development, which is illustrated in FIG. 12, of consecutive three (⅓)-scale reduced numeric characters "1", "2" and "0" is performed. Incidentally, in the case of performing the dot development of consecutive two (⅓)-scale reduced numeric characters "1" and "2", the contents of data stored in the area 1 at the time of finishing the development are data as illustrated in FIG. 13(D).

As above described, in accordance with the third embodiment of the present invention, the tape printing device can deal with various numeric representation as users of the first and second embodiments desire.

Incidentally, partial modifications similar to those made to the second embodiment can be made to the third embodiment. Thus, the description of the modifications of the third embodiment is omitted here.

Next, still another tape printing device embodying the present invention, namely, a fourth embodiment of the present invention will be described hereinbelow. The fourth embodiment does not relate to the advantages in printing numeric characters differently from the second and third embodiments, but relate to the advantages in printing the entire character string (hereunder referred to as a text) to be printed.

First, the electrical configuration of the entire tape printing device, namely, the fourth embodiment is illustrated similarly as in the aforementioned functional block diagram of FIG. 7. Therefore, the description of the electrical configuration of the entire tape printing device is omitted. The fourth embodiment, however, is different in part of the processing programs to be executed by the CPU 21 from the embodiment of FIG. 7.

Figure 15:
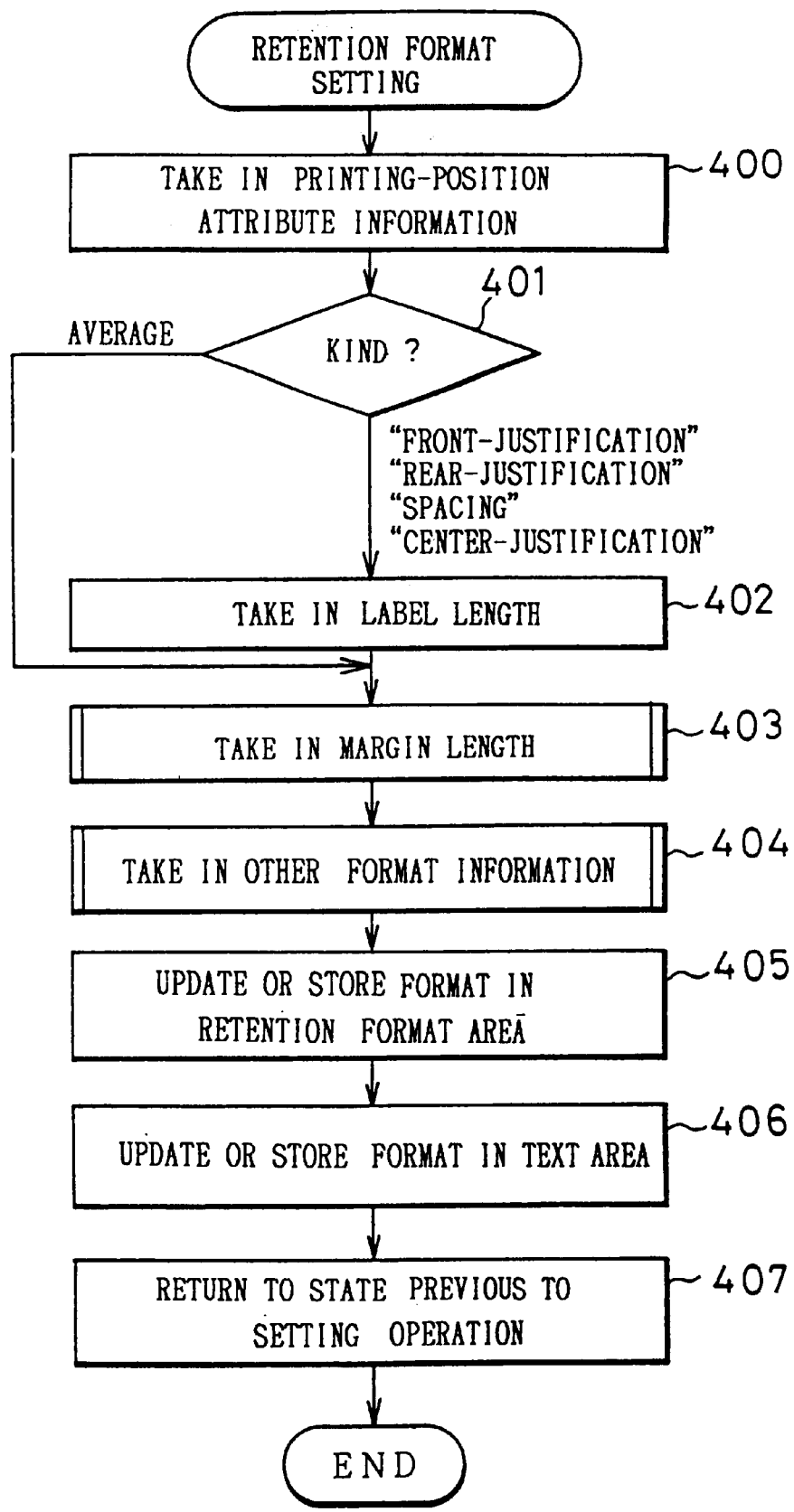
FIG. 15 is a flowchart for illustrating a process of setting a retention format in the fourth embodiment of the present invention.

Hereinafter, an operation of setting the retention format relating to the characteristic features of the fourth embodiment, which is performed by the CPU 21, will be described in detail by referring to a flowchart of FIG. 15.

Here, note that a "format" is an arrangement or layout of a text to be printed on tape or the like, which has "printing effects" on the text. Namely, the format has "printing effects" on the entire text, regardless of whether a character string written longitudinally or vertically and another character string written transversely or horizontally are mixed in the text, whether the text has a part containing characters of lines, the number of which is different from the number of lines of characters contained in the remaining parts thereof, and whether the text has a part containing characters, the size of which is different from that of characters contained in the remaining parts thereof. The "format" relates to "printing effects", for example, the length of a label, the length of each of front and rear margins of a label, and whether or not mirror image characters are used as all characters.

There are two kinds of "formats": namely, a "retention or permanent format" retained in the device; and a "text format" established corresponding to each of texts to be printed. When a new text is created, the retention format is copied as the text format corresponding to this new text. In the case of the fourth embodiment, the alteration of a format is allowed only in the case that the format is the retention format.

When a format key of the key-operating portion 11 is operated, the CPU 21 starts performing an operation of FIG.

15. First, in step 400, the CPU 21 takes in information (hereunder referred to as printing-position attribute information) concerning the printing position, at which a text is printed, in a label and also concerning the label length. Further, in step 401, the CPU 21 identifies the printing-position attribute information.

The tape printing device of this embodiment permits a user to designate the length of a label to be printed and ejected. There are the following alternatives for the "printing-position attributes": namely, "normal"; "front- or left-justification"; "center-justification"; "rear- or right-justification"; and "spacing".

In the case of the alternative "normal", a user does not designate or specify the length of a label. Incidentally, the effective length of a label is a sum of the lengths of front and rear margins and a text part as will be described later. Further, in the case of the alternative "front-justification", first, a front or left margin of the length designated by a user is secured in a label of the length designated by the user. Thereafter, a part having a length being necessary as a text part is secured in the label. Thus, a part of the remaining length of the label is used as a rear or right margin. Moreover, in the case of the alternative "center-justification", first, a part having a length being necessary as a text part is secured in the central portion of a label of the length designated by a user. Thus, the remaining front and rear parts of the label are used as margins. Moreover, the margins have at least sizes designated by the user. Furthermore, in the case of the alternative "rear-justification", first, a rear or right margin of the length designated by a user is secured in a label of the length designated by the user. Thereafter, a part having a length being necessary as a text part is secured in front of the rear margin of the label. Thus, a part of the remaining length of the label in front of the text part is used as a front or left margin. Additionally, in the case of the alternative "spacing", first, front and rear margins, each of which has a length designated by a user, are secured in a label which also has a length designated by a user. In the remaining central portion of the label, characters of a text are arranged by performing an "equal spacing". The CPU 21 usually prompts a user to select one of these alternatives by using a menu system.

In the case that the alternative "normal" is selected, the CPU 21 takes in margin-length information in step 403. Subsequently, the CPU 21 takes in other kinds of format information in step 404. Further, in the case that one of the alternatives "front-justification", "rear-justification", "center-justification" and "spacing", the CPU 21 takes in label-length information and margin-length information serially in steps 402 and 403. Then, the CPU 21 takes in other kinds of format information.

A menu stored in a retention format area of the RAM 23 is also used as an initial menu displayed when taking in each of the aforementioned kinds of information. Further, when turning on the power, a default value of the retention format stored in the ROM 22 is set in the retention format area.

When instructed to finish the setting after the format information of the other kinds (concerning mirror image characters and so forth) is set, the CPU 21 causes the RAM 23 in steps 405 to 407 to store the contents of the retention format, which is held in the retention format buffer, in the retention format area thereof. Moreover, the contents of the retention format are stored (namely, newly stored or stored after updating the existing contents) as the formats for texts, which are stored in a text area of the RAM 23 at that time. Thereafter, an operation of returning to a state previous to the setting of the retention format. Thus, the CPU 21 finishes a sequence of steps of the retention format setting operation.

Next, an operation of taking in information representing the margin length to be performed in step 403 will be described in detail by referring to a flowchart of FIG. 14(A).

When starting such an operation, the CPU 21 causes the display in step 410 to indicate initial candidate alternatives for a kind of a margin. Subsequently, the CPU 21 identifies an input key in step 411. Incidentally, for example, a kind set heretofore is used as the initial candidate alternative. When a key input for instructing the change of the candidate alternative is performed, the CPU 21 changes and displays the candidate alternative in the order of changing the candidate alternative as illustrated in FIG. 14(B). Thereafter, the CPU 21 returns to step 411. In contrast, when the selection key is operated, the CPU 21 judges that the kind of a margin corresponding to the candidate alternative is definitely determined. Further, the CPU 21 causes the RAM 23 in step 413 to store this candidate alternative in a buffer for setting the retention format. Then, the CPU 21 returns to a main routine (see FIG. 15).

Even if practical or actual values of the length of a margin are displayed so as to make a user select, it is difficult for the user to imagine the appearance of a resultant label. Thus, in the case of this fourth embodiment of the present invention, the expressions "extremely short", "slightly below", "average", "somewhat larger" and "extra-large" are displayed. Then, a user selects the length of margins according to the displayed expressions. The lengths respectively corresponding to the expressions "extremely short", "slightly below", "average", "somewhat larger" and "extra-large" are invariably determined as illustrated in FIG. 14(C). A translation table therefor is stored in the ROM 22. Incidentally, although the lengths are indicated in units of millimeters (mm) in FIG. 14(C), the numbers of feeding pulses for the tape/ribbon feeding motor 31, which is constituted by a stepping motor, are actually stored as margin length data. Therefore, the values of the margin length indicated in FIG. 14(C) and FIG. 14(D) (to be described later) are rough values thereof.

In the case of this fourth embodiment of the present invention, in addition to the aforementioned kinds of margins, whose invariant values are selected by a user, there are provided other kinds of margins, which are represented by the terms "automatic", "continuous" and "cutout".

Here, in the case of the kind of a margin, which is designated by the term "automatic", the length of the margin is automatically set according to the width of tape. Further, the device is adapted so that even when the width of the tape to be loaded in the device is changed, an approximately same label can be obtained. For example, the length of the margin is set according to the width of the tape, as illustrated in FIG. 14(D). The translation table therefor is also provided in the ROM 22.

Incidentally, in both cases that the width of tape is 6 mm and that the width of tape is 9 mm, the length of the margin is set at 9 mm for the following reason. Namely, in the case of this embodiment, the distance between the thermal head 32 and the cutter is 8 mm. Further, the printing of the text part is not started by driving the thermal head 32 until the tape/ribbon feeding motor 31, which is constituted by the stepping motor, enters a stationary rotation mode. Moreover, the length of tape fed in a time required to change the state of the tape/ribbon feeding motor 31 from a stopped state to a stationary rotation state is 1 mm or so. As a result, even if the printing of the text part is immediately commenced when printing a label, a blank portion having a length of 9 mm is provided in front of the text part. Thus, in the cases of 6-mm wide tape and 9-mm wide tape, the length of this blank portion, namely, 9 mm is determined as the length of the margin. In the case of using the 6-mm wide tape, a shorter blank portion is favorable for obtaining an approximately same label. For such a purpose, the text part may be printed by first printing cut marks and thereafter securing a front margin. In this case, a user is required to perform an operation of cutting a discharged label at the cut mark. Thus, this method is inconsistent with the term "automatic" that implies the unnecessariness of such a manual operation. Consequently, even in the case of using the 6-mm wide tape, the length of the margin is set at 9 mm.

Incidentally, in the case that the length of the margin is 1 mm indicated by the expression "extremely short", this fourth embodiment of the present invention employs a method which comprises the steps of first printing cut marks, subsequently securing a front margin and thereafter printing the text part.

Figure 16A:
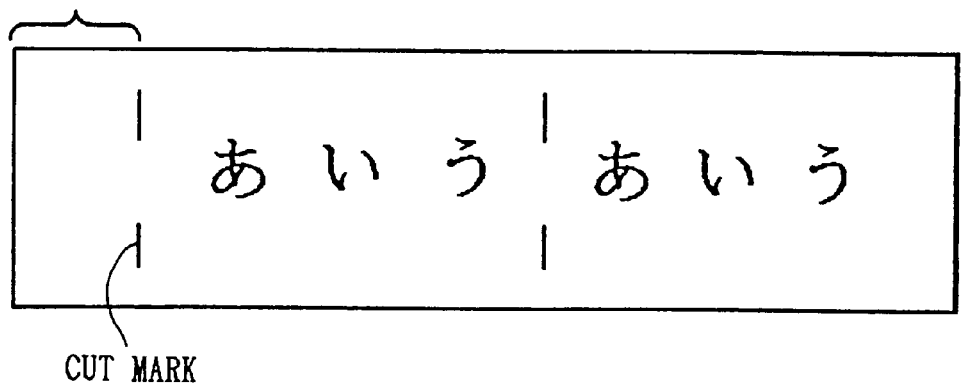
FIGS. 16(A) and 16(B) are diagrams for illustrating examples of the kinds "continuous" and "cutout" of margins.

In the case of the kind of a margin, which is designated by the term "continuous", the text is printed by setting the length of the margin at 0. Further, the label efficiency in the case of successively printing the text a plurality of times is taken into consideration. Namely, as illustrated in FIG. 16(A), at the first printing operation, the tape printing device immediately prints cut marks on tape and then proceeds to the printing of the text part thereon. Upon completion of the printing of the text part, the tape is stopped instead of further feeding the tape. Similarly, at the second or later printing operation, the tape printing device immediately prints the cut marks on tape and subsequently proceeds to the printing of the text part thereon. Upon completion of the printing of the text part, the tape is stopped without further feeding the tape.

Incidentally, the "front spare portion" of FIGS. 14 and 16 are blank portions of discharged tape, which do not compose a label portion, and thus are unnecessary portions for making a label and should be removed.

Figure 16B:
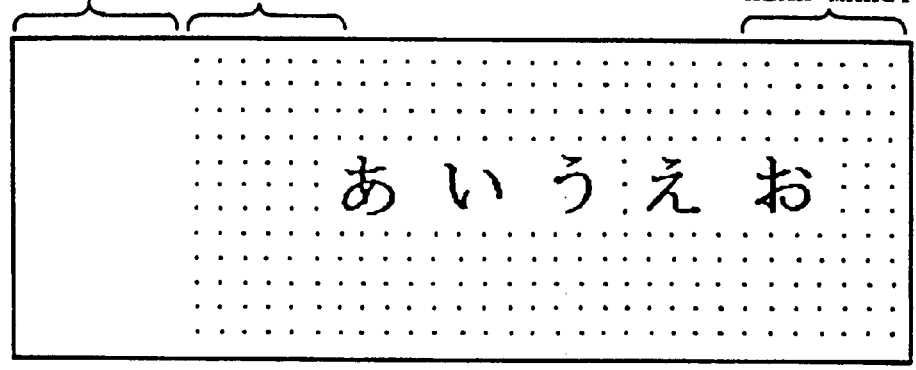

In the case of the kind of a margin, which is designated by the term "cutout", a pattern consisting only of intersections between cross-ruled lines of squared paper (namely, a pattern in which dots are arranged in a matrix manner (hereunder referred to as square-array dots or as a square-array dot pattern) is superposed on the text part and is further printed over the entire region to be printed. Namely, as illustrated in FIG. 16(B), when instructing to print, the printing of the square-array dots is immediately started. Upon completion of the printing of the square-array dots on the front margin, the square-array dot pattern is superposed on the text part and moreover, this pattern and the text part are printed. Further, after finishing the printing of the text part, the square-array dots are printed on the rear margin.

Here, the reason for providing the "cutout" is that when a user makes a label, which has desirable front, rear, top and bottom margins, by cutting tape, the square-array dot pattern affords reference positions for cutting the tape and thus can provide added cutting-convenience.

Next, a printing operation, especially, an operation of forming the front and rear margins will be described hereinafter by referring to a flowchart of FIG. 17.

In the text area of the RAM 23, texts, to which formats are given, are stored. When the device is in a state in which a text is stored in the text area, a user can instructs the device at an arbitrary point of time to print the text.

Figure 17:
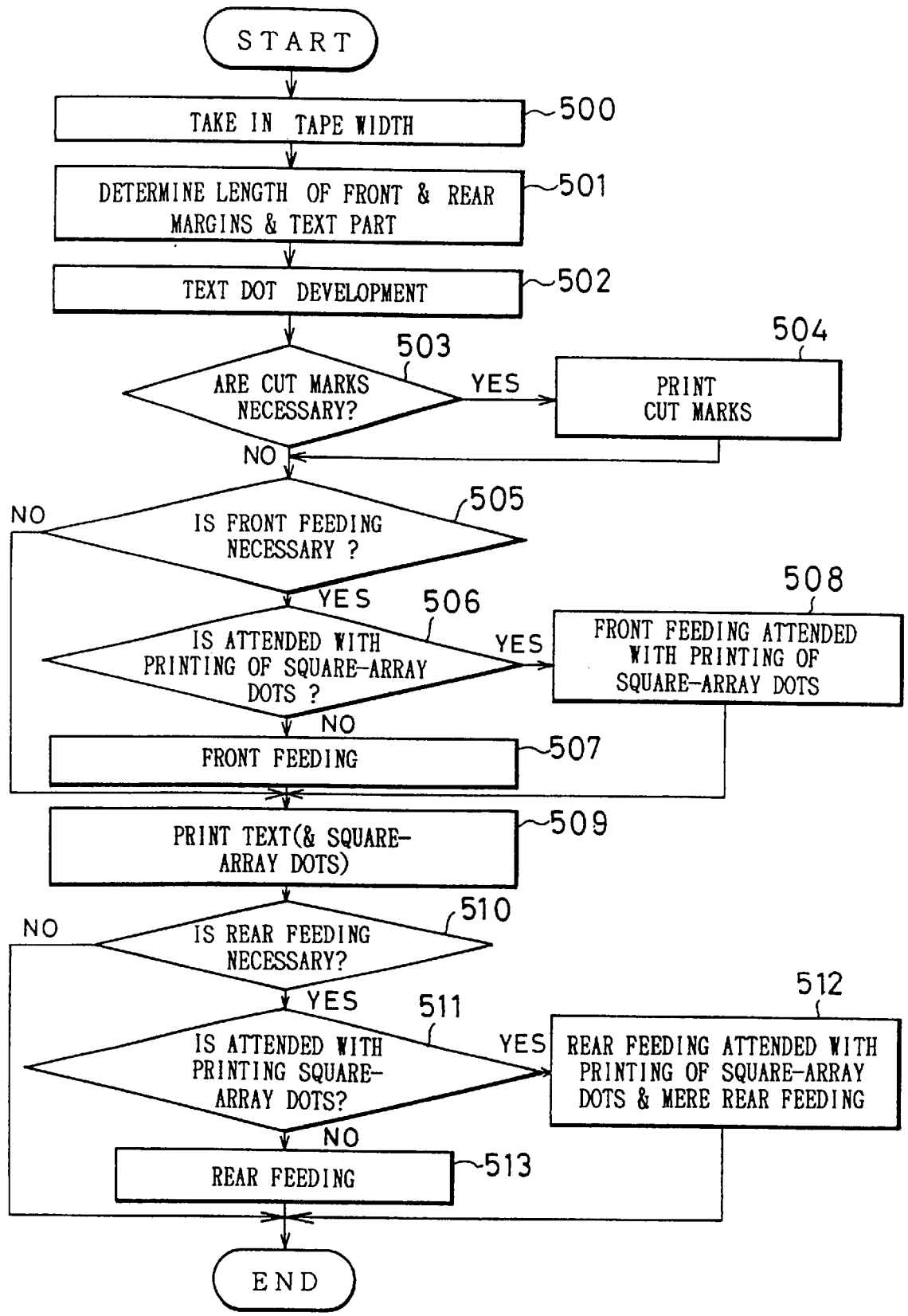
FIG. 17 is a flowchart for illustrating a printing operation of the fourth embodiment of the present invention.

When a printing key is operated, the CPU 21 starts executing a printing program of FIG. 17. First, the PU 21 takes in tape width information in step 500. Then, the CPU 21 determines the length of each of the front margin, the text part and the rear margin (thus, the length of a label), a front feeding distance and a rear feeding distance according to the format information stored in the text area. Here, the non-printing feeding of tape is simply referred to as "feeding". Moreover, the non-printing feeding of a part of tape in front of the text part is referred to simply as "front feeding". Furthermore, the non-printing feeding of a part of tape behind the text part is referred to simply as "rear feeding".

Here, in the case of the kind of a margin, which is designated by the term "automatic", the tape width information is directly utilized for determining the length of each of the front and rear margins.

Incidentally, the tape width information may be taken into from the tape-width detecting sensor 12. Alternatively, the tape width information preliminarily stored in the RAM 23 after inputted from the tape-width detecting sensor 12 when loading a tape cartridge into the device may be taken out of the RAM 23. Further, in the case that no tape is loaded into the device, a warning message is displayed and then a sequence of operations (not shown) are immediately finished.

Moreover, in the case that a part of tape (which is 8 mm in length) between the thermal head 32 and the cutter can be used as a front margin, this part of tape is used as the front margin, just as it is. Thus, the length of the front margin is not always equal to the front feeding distance. Basically, the rear feeding distance is a sum of the length of the rear margin and the length (9 mm) of the positional shift or deviation between the thermal head 32 and the cutter. The "rear feeding" is performed so as to form the rear margin and to adjust the rear end position of the rear margin (thus, the rear end position of the label) to the position of the cutter.

Thereafter, the CPU 21 performs the development of a text, which has been stored in the text area of the RAM 23, in the printing buffer in step 502. If the text contains a half-size numeric character or a (1/M)-scale reduced numeric character, the development method of the aforesaid second or third embodiment is applied.

Next, the CPU 21 judges in step 503 whether or not cut marks are printed. In the case that the cut marks are necessary, the cut marks are printed in step 504. As above described, the printing of the cut marks is necessary in the cases of the kinds of margins respectively corresponding to the expressions "continuous" and "extremely short". Further, the printing of the cut marks may be performed by the dot development. Alternatively, the printing thereof may be performed by controlling dot on/off signals by means of software.

Thereafter, the CPU 21 judges in step 505 whether or not the front feeding is necessary. If necessary, the CPU 21 further judges in step 506 whether or not the front feeding is attended with the printing of the square-array dots. Further, if not attended with the printing of the square-array dots, the CPU 21 drives and controls the tape/ribbon feeding motor 31 in step 507, so that the front feeding is performed. Conversely, if attended with the printing of the square-array dots, the CPU 21 drives and controls not only the tape/ribbon feeding motor 31 but the thermal head 32 suitably in step 508, so that the front feeding attended with the printing of the square-array dots is performed.

As is obvious from FIGS. 14(C) and 14(D), the printing of the front feeding is necessary in the cases of the kinds of margins respectively corresponding to the expressions "average", "somewhat larger", "extra-large" and "cutout" (see FIG. 14(C)) and in the case of the kind of margins corresponding to the expression "automatic" when the 12-mm wide tape is loaded (see FIG. 14(D)). As above stated, in the case of the kind of margins corresponding to the expression "cutout", the front feeding is accompanied with the printing of the square-array dots.

Thereafter, in step 509, the CPU 21 drives and controls the tape/ribbon feeding motor 31 and further drives and controls the thermal head 32 according to the contents of the text developed in the printing buffer. Thereby, the printing of the text is performed.

Next, the CPU 21 judges in step 510 whether or not the rear feeding is necessary. If necessary, the CPU 21 further judges in step 511 whether or not the rear feeding is attended with the printing of the square-array dots. Further, if not attended with the printing of the square-array dots, the CPU 21 drives and controls the tape/ribbon feeding motor 31 in step 513, so that the rear feeding is performed. Conversely, if attended with the printing of the square-array dots, the CPU 21 drives and controls not only the tape/ribbon feeding motor 31 but the thermal head 32 appropriately in step 512, so that the rear feeding attended with the printing of the square-array dots is performed by the length of the rear margin. Then, a mere rear feeding is performed until the rear end position of the rear margin reaches the position of the cutter.

When the rear feeding is finished, or when the rear feeding is unnecessary, the CPU 21 terminates the sequence of steps of the printing operation. Then, the CPU 21 returns the screen of the display to the text indicating image displayed at the time of instructing to print.

As is obvious from FIG. 14(C), the rear feeding is necessary in the cases other than the case corresponding to the expression "continuous".

Incidentally, throughout the period during which the front feeding, the text printing and the rear feeding are performed, the tape/ribbon feeding motor 31 is continuously driven and on the other hand, the thermal head 32 is driven at the position of the tape appropriately. Thus, the following control method is employed. Namely, actually, the number of total driving pulses is initially set for driving the tape/ribbon feeding motor 31. Then, each time when a pulse is applied to the tape/ribbon feeding motor (namely, the stepping motor) 13, a parameter representing the number of total driving pulses is decremented by 1. Thereafter, when the value, at which this parameter is set, becomes 0, the motor 31 is stopped.

Here, in the case that the operating key for "stopping the printing" is operated, during the process consisting of steps 503 to 513, an interruption operation of stopping the printing, which is similar to the interruption operation as described in the description of the first embodiment, is performed.

The square-array dots may be printed after performing the development of the square-array dot pattern in the printing buffer. Alternatively, the printing of the square-array dots may be performed in a software-controlled manner when transferring a dot on/off signal to the thermal head 32. Further, alternatively, the printing of the square-array dots may be performed by providing a hardware structure therefor in the head drive circuit 34.

Figure 18:
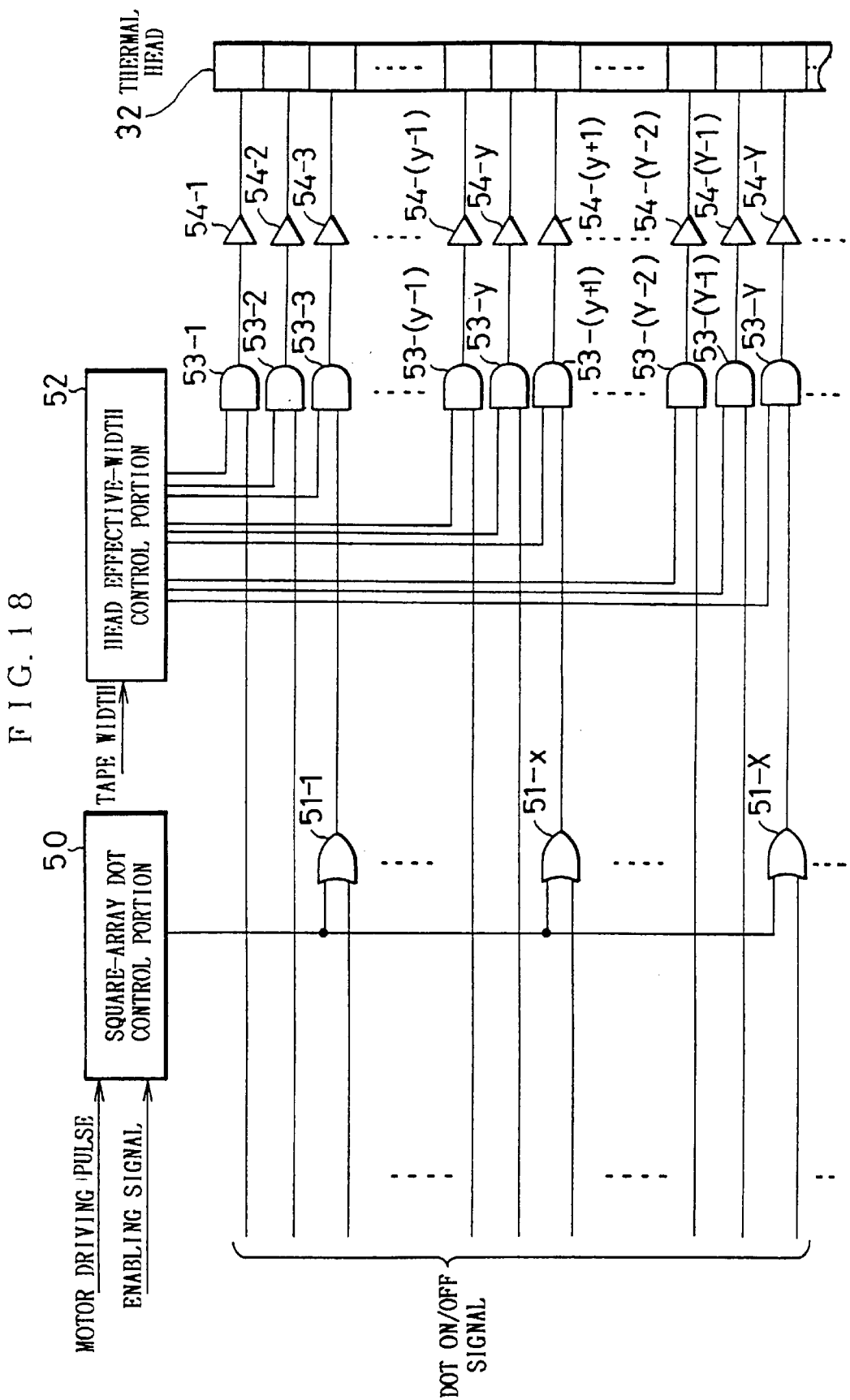
FIG. 18 is a block diagram illustrating the configuration of an output portion for printing square-array dots in the case of the fourth embodiment.

FIG. 18 illustrates an example of the electrical configuration of the hardware for printing square-array dots, which is provided in the head drive circuit 34.

As shown in FIG. 18, driving pulses for driving the tape/ribbon feeding motor 31, as well as enabling signals which have a significant level only during the printing of square-array dots are printed, are supplied to a square-array dot control portion 50. In the period time during which the enabling signal has a significant level, the square-array dot control portion 50 puts only one output pulse thereof into a significant state every application of M motor drive pulses thereto. Further, OR-gates 51-1, . . . , 51-X, . . . respectively correspond to heating elements of the thermal head 2, which are selected every Nth heating element thereof, and are adapted to output a signal representing the logical sum between a dot on/off signal, which is supplied from the control portion 20, and an output pulse of the square-array dot control portion 50.

Therefore, an output pulse of each of the OR-gates 51-1, . . . , 51-X, . . . becomes in an on-state every Mth motor driving pulse, irrespective of the dot on/off signal supplied from the control portion 20. Moreover, because the OR-gates 51-1, . . . , 51-X, . . . respectively correspond to the heating elements of the thermal head 2, which are selected every Nth heating element thereof, the arrangement of dots formed on the tape correspondingly to these output pulses, respectively, becomes the square-array dot pattern.

Incidentally, the output pulses of the OR-gates 51-1, . . . , 51-X, . . . and the dot on/off signals are supplied to the heating element drivers (namely, the drivers selected from the drivers 54-1 to 54-Y correspondingly to a predetermined width) through AND-gates (namely, the gates selected from the gates 53-1 to 53-Y correspondingly to a predetermined width), which are set by a head effective-width control portion 52 in such a way as to be in an enabled state. Thereby, predetermined ones of the heating elements are turned on or off.

In accordance with the fourth embodiment of the present invention, the "automatic" mode, in which a label is printed in such a manner as to have fixed margins according to the tape width, is provided in the device correspondingly to one of the kinds of margins. Thus, when a user establishes the "automatic" mode, a similar label can be obtained even if the tape width is changed. Consequently, a user can easily obtain a label which has margins as the user desires.

Moreover, in accordance with the fourth embodiment of the present invention, the "cutout" mode, in which the square-array dots are printed on the front and rear margins and the text part, is provided in the device correspondingly to one of the kinds of margins. Thus, when a user establishes the "cutout" mode, the square-array dots are printed. Thereby, for the purpose of forming desirable margins, a user can cut the tape by using the square-array dot as a reference for cutting. Consequently, this can facilitate the attainment of a label which has margins as a user desires.

Next, a fifth embodiment, which is an example of application of the fourth embodiment, of the present invention will be described with reference to the accompanying drawings, by concentrating on the differences between the fifth embodiment and the fourth embodiment.

Regarding the hardware, the fifth embodiment is different from the fourth embodiment in that the fifth embodiment is provided with a cutter operation detecting sensor for detecting that the cutters are operated. Incidentally, in the case that an automatic cutter is applied to the tape printing device, it is unnecessary for the fifth embodiment to have the cutter operation detecting sensor.

In the case of the fourth embodiment, in consideration of the physical distance (8 mm) between the thermal head 32 and the cutter and the tape feeding distance (1 mm) required until the tape/ribbon feeding motor 31 constituted by a stepping motor reaches a stationary rotation state, the margins, each of which has a length of 9 mm and thus does not require the printing of cut marks, are established correspondingly to the 9-mm wide tape in the "automatic" mode.

Therefore, the margins, each of which has a somewhat long length, are set correspondingly to other kinds of the tape width in the fourth embodiment.

In this fifth embodiment of the present invention, as illustrated in FIG. 19, the length of margins to be provided in the "automatic" mode are established so that similar labels can be obtained even in the cases of using the 6-mm wide tape and the 9-mm wide tape. Namely, in the case of using the 6-mm wide tape, such a length of margins is set at 3 mm. Further, in the case of using the 9-mm wide tape, such a length of margins is set at 6 mm. Thus, in such cases, the length of the margins is set in such a way as to be shorter than the length of 9 mm, which is predetermined by taking the physical distance between the thermal head 32 and the cutter and so on into consideration.

FIG. 20 illustrates a part of a printing operation for forming the front or left margin having such a short length without printing cut marks.

Incidentally, the process illustrated in FIG. 20 is performed even in the case of employing the kinds of margins respectively corresponding to the expressions "extremely short" and "slightly below", in which the length of the margins is set in such a way as to be shorter than the length of 9 mm which is determined according to the physical distance between the thermal head 32 and the cutter and so forth. Further, the part of the operation, which is illustrated in FIG. 20, corresponds to the process consisting of steps 506 to 509 of FIG. 17.

Moreover, a printing-operation stopping position (to be described later) is determined (see step 501) before the part of the printing operation, which is illustrated in FIG. 20, is performed. Incidentally, the printing-operation stopping position is a position at which a part of tape, whose length is equal to, for example, 9 mm (namely, equal to the length of a margin), is printed.

When enters step 600 on condition that the front feeding is unnecessary, the CPU 21 drives and controls the tape/ribbon feeding motor 31. Moreover, the CPU 21 drives and controls the thermal head 32 according to the contents of a text developed in the printing buffer and thus causes this thermal head to perform the printing operation. Then, when the leading or front end position of the printed text reaches a position, which is away from the position of the cutter toward the thermal head 32 by a distance that is equal to the predetermined length of the front margin, the CPU 21 stops the operation of printing the text temporarily in step 601. Thereafter, in step 602, the CPU 21 controls the display drive circuit 36 and thus causes the liquid crystal display 35 to display a message that prompts a user to operate the cutter. Then, in step 603, the CPU 21 waits for an operation detecting signal coming from the cutter operation detecting sensor. When receiving the operation detecting signal, the CPU 21 drives and controls the tape/ribbon feeding motor 31 in step 604. Moreover, the CPU 21 drives and controls the thermal head 32 according to the contents of the text developed in the printing buffer. Thereby, the CPU 21 causes the thermal head 32 to resume the operation of printing the text.

Incidentally, in the case that the tape printing device is provided with an automatic cutter, the operation to be performed in steps 602 and 603 is replaced with a tape cutting operation by driving the automatic cutter.

As a result of performing such operations, a part of the tape, which is provided between the thermal head 32 and the cutter when instructing to print, can be utilized as the front margin (see FIG. 22 (to be described later)).

In the case of the fifth embodiment, it is premised that the tape printing device cannot release the tape from the driving force of the tape/ribbon feeding motor 31. Thus, if a text is not printed until the motor reaches a stationary rotation state, an erroneous blank part corresponding to the distance by which the tape is fed during the motor is accelerated after and is decelerated before the interruption of the printing operation and thus the printing operation is not performed, is formed in the text part.

Thus, in the case of this fifth embodiment of the present invention, the printing of a text is performed even when accelerating and decelerating the tape/ribbon feeding motor 31 during the process of FIG. 20. During accelerating and decelerating this motor, naturally, the tape feeding speed is lower than the speed in the stationary rotation state. Therefore, when accelerating and decelerating this motor, the duration or on-time (namely, the pulse width) of the dot on/off signal is changed from that thereof when the motor is in the stationary rotation state.

FIG. 21 is a diagram for illustrating such a change in pulse width of the dot on/off signal. In the case of the fifth embodiment, information as illustrated in FIG. 21 is stored in the ROM 22. Incidentally, it is assumed that the tape/ribbon feeding motor 31 requires five drive pulses during the state of the motor is changed from the stopped state to the stationary rotation state when accelerating the motor, and during the state of the motor is changed from the stationary rotation state to the stopped state when decelerating the motor.

In the first drive pulse duration at the time of accelerating the motor, and in the fifth drive pulse duration at the time of decelerating the motor, the tape is fed at the lowest speed. Thus, the duration or on-time (namely, the pulse width) of the dot on/off signal is minimized. As the speed of the motor in a drive pulse duration becomes closer to the speed thereof when being in the rotation state, the drive pulse duration is made to be closer to the duration or on-time (namely, the pulse width) of the dot on/off signal when being in a normal state.

Through such a control operation, sufficient print quality can be obtained even when performing the printing operation during the tape/ribbon feeding motor is accelerated and decelerated.

Figure 22A:
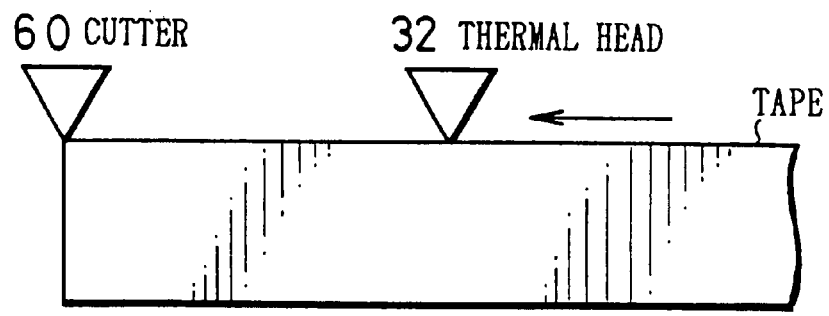
FIGS. 22(A) to 22(C) are diagrams for illustrating how a short front or leading margin is formed by the fifth embodiment of the present invention.
Figure 22B:
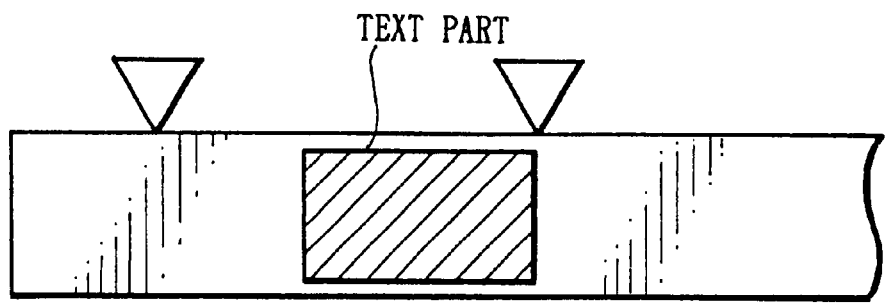
Figure 22C:
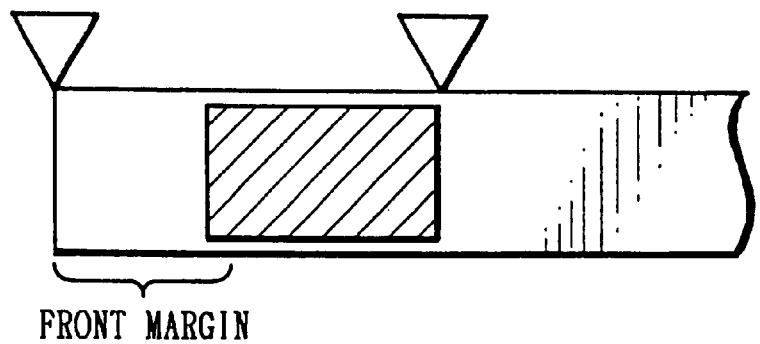

FIG. 22 illustrates how a 3-mm long front margin is formed. When instructing to print, a part, whose physical length is 8 mm, of the tape is present between the thermal head 23 and a cutter 60, as illustrated in FIG. 22(A). In such a state, the CPU advances to the process of FIG. 20, so that the printing of a text is commenced. Thereafter, when the printing of the text is stopped temporarily, a part having a length, which is the predetermined length (3 mm) of the front margin, is formed between the position of the cutter 60 and the front end position of the text, as illustrated in FIG. 22(B). When a user cuts the tape in accordance with a message, which prompts the user to do so, in this situation, a label comes to have a desirable front margin, as illustrated in FIG. 22(C).

Thus, because the "automatic" mode, in which the tape is printed in such a manner as to have a margin of the fixed length according to the width of the tape, is provided in this fifth embodiment of the present invention as a mode of the kind of margins, a user can obtain similar labels when the "automatic" mode is established in the device, even if the width of the tape is changed. Moreover, this can facilitate the attainment of a label which has margins as the user desires. Furthermore, in case of the fifth embodiment, the "cutout" mode, in which the square-array dots are printed on the front and rear margins and the text part, as a mode of the kind of margins. Therefore, when the user establishes the "cutout"

mode, the user can cut the tape by using the square-array dot as a reference for cutting. Consequently, this also can facilitate the attainment of a label which has margins as the user desires.

Additionally, in accordance with the fifth embodiment, even when the length of margins is shorter than the predetermined length, a part of tape, which is present in front of the thermal head, can be utilized as a front margin. Thereby, the efficiency in using the tape can be increased.

Besides, in the case of the fifth embodiment, a text is printed on tape even when accelerating and decelerating the tape. Thus, the tape printing device has not to use a part, which is fed during the tape is accelerated and decelerated, of the tape as a margin. The efficiency in utilizing tape can be further enhanced from this standpoint.

Further, in accordance with the fifth embodiment, on the whole, the total length of fed tape, as well as the power consumption, can be reduced.

In the foregoing description, additional embodiments obtained by modifying the fourth and fifth embodiments have been described. However, other modifications of the fifth embodiment can be described hereinbelow.

Even in the case of setting the "automatic" mode, in which short margins are provided, as a mode of the kind of margins, the printing method, by which the tape has cut marks, may be employed.

Further, even in the case of setting the "automatic" mode, in which the length of margins is determined according to the width of tape loaded in the device, as a mode of the kind of margins, the stages or levels as indicated by the expressions "average" and "slightly below" may be provided.

In the foregoing description, there has been described the embodiments in which the "cutout" mode is established as a mode of the kind of margins. However, a mode of the kind of margins may be designated by using other methods. For example, the square-array dots may be printed by providing a "cutout printing key" in the device in addition to the printing key and by designating the printing of the square-array dots. Moreover, in this case, space or blank portions established in the text part may be utilized as the margins.

The method of printing a text even at the time of accelerating and decelerating tape may be employed in the case that although the interruption of the printing operation is not caused, the margin length is longer than the predetermined length.

Next, a further tape printing device embodying the present invention, namely, a sixth embodiment of the present invention will be described hereinbelow. A characteristic aspect of the sixth embodiment resides in the printing method (namely, the enlargement printing) for forming a pseudo label whose width is larger than the width of tape loaded in the tape printing device.

Incidentally, the electrical configuration of the entire tape printing device, namely, the sixth embodiment is illustrated similarly as in the aforementioned functional block diagram of FIG. 4. Therefore, the description of the electrical configuration of the entire tape printing device is omitted. The sixth embodiment, however, is different from the embodiment of FIG. 4 in that a processing program for the enlargement printing is prepared as the processing program to be executed by the CPU 21.

The tape printing device of this embodiment is provided with an operating element for the normal printing of a text and another operating element for the enlargement printing of a text as the operating elements for printing. When the operating element for the normal printing is operated, the aforementioned printing operation as illustrated in FIG. 17 or 20 is performed.

Thus, the enlargement printing operation, which is characteristic operation of this sixth embodiment of the present invention, will be described hereinafter.

Figure 23:
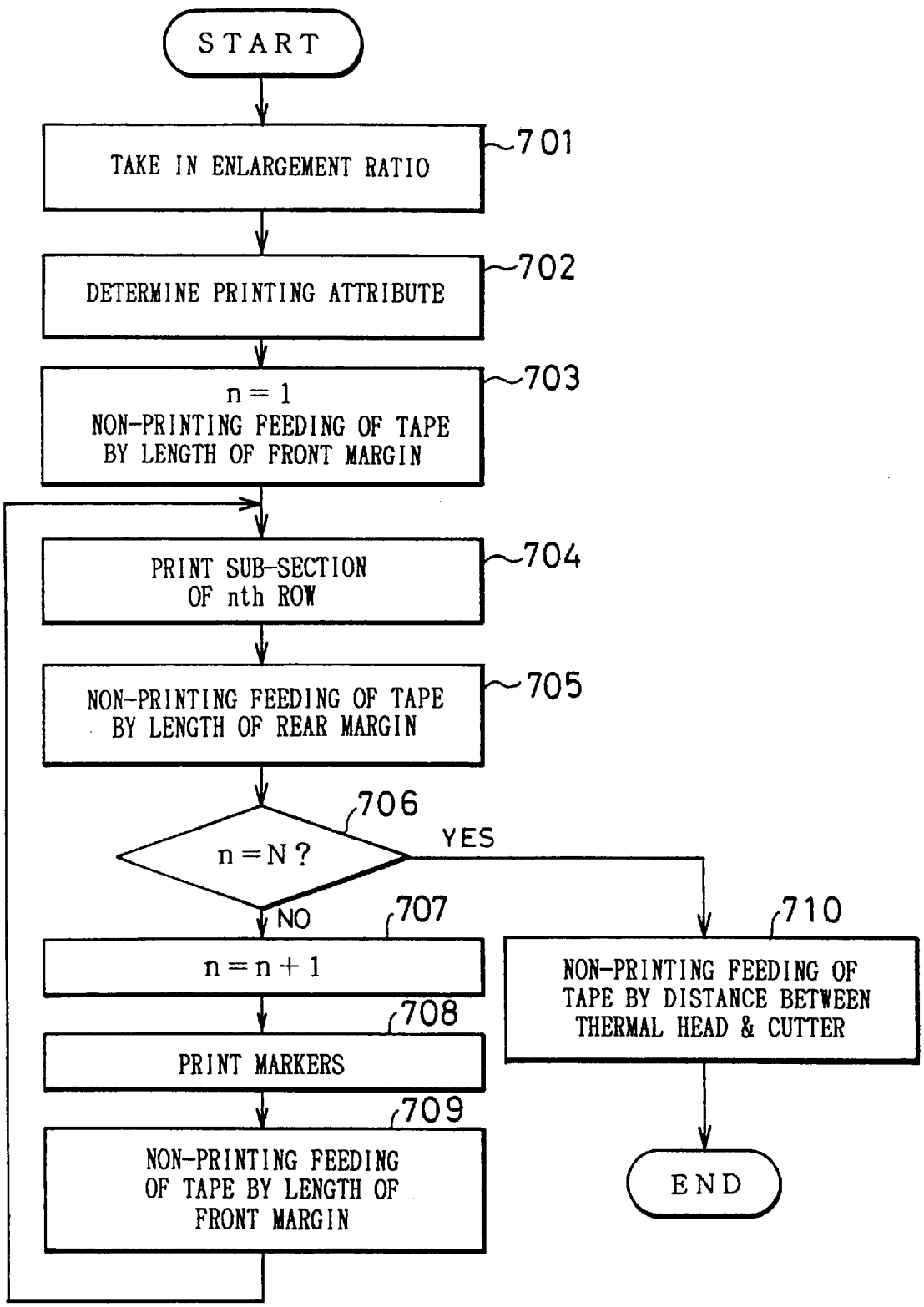
FIG. 23 is a flowchart for illustrating an enlargement printing operation of a sixth embodiment of the present invention.

When the operating element for the enlargement printing is operated by a user during a text is displayed on the screen of the liquid crystal display 5, the CPU 21 starts executing the enlargement-printing processing program illustrated in FIG. 23.

Further, the CPU 21 first causes the liquid crystal display 35 in step 701 to display a message that prompts a user to designate an enlargement ratio. Then, the CPU 21 takes in the enlargement ratio N designated by the user in response to this message. At that time, the CPU 21 may cause the display 35 to display all of numeric characters representing the enlargement ratio on the screen thereof so that the user can select an enlargement ratio by using a cursor and the selection operating element. Alternatively, the device may cause the user to input the numeric characters representing a enlargement ratio and thereby select this enlargement ratio. For example, in the case that the enlargement ratios accepted by the device are small such as 2 times or 3 times, the former method is applied to the operation.

When the enlargement ratio N is designated, the CPU 21 determines the printing attributes such as the front and rear margins and the character positions corresponding to each part of the tape, which is divided into N portions in the longitudinal direction of the tape, according to the enlargement ratio N, the width of the tape loaded into the device, which is detected by the tape-width detecting sensor 12, and the attributes designated corresponding to a character string to be printed, in step 702.

In the case of this embodiment, various kinds of attributes, such as a kind of a character size, a method for providing the front and rear margins and the length of printing tape, are imparted to the character string. Although these attributes are determined on condition that the designated values thereof are used for the normal printing, these attributes are also utilized in the case of the enlargement printing.

Figure 24A:
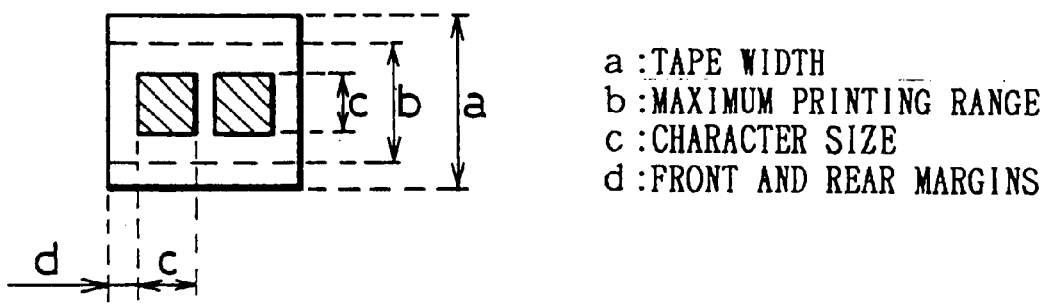
FIG. 24 is a diagram for illustrating a process of determining printing attributes at the time of performing an enlargement printing operation in the sixth embodiment of the present invention.
Figure 24B:
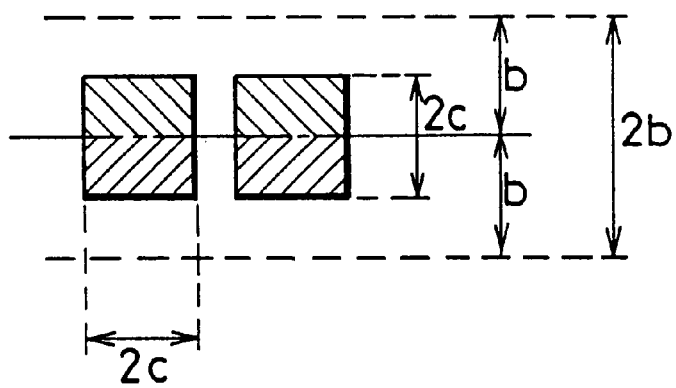
Figure 24C:
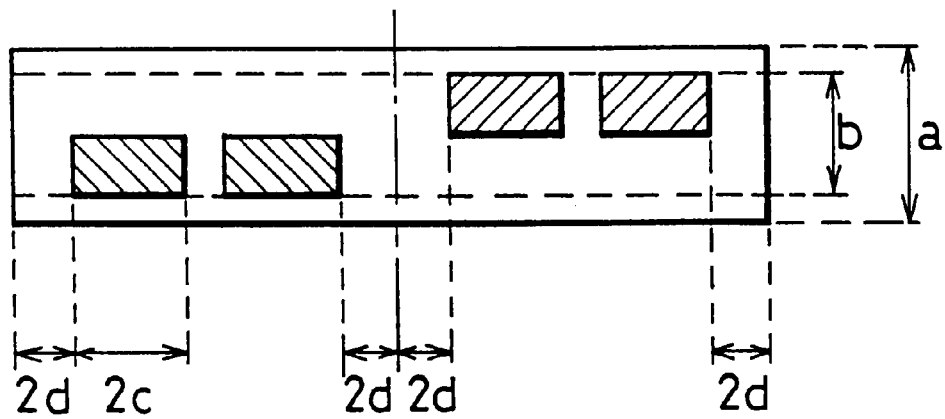

For instance, when the enlargement ratio N is 2 in the case that actual printing attributes, such as the positions of characters and the length of the front and rear margins, are determined at the time of performing the normal printing, as illustrated in FIG. 24(A), on the basis of the width of the loaded tape, which is detected by the tape-width detecting sensor 12, and the attributes designated correspondingly to a character string to be printed, the actual printing attributes, such as the positions of the characters and the length of the front and rear margins, are determined in such a manner that each of the longitudinal and lateral sizes of the characters printed on a finished label is 2 times the corresponding normal size of the characters as illustrated in FIG. 24(B) and that the tape, in which the finished labels are contained as illustrated in FIG. 24(C), is obtained.

When the printing attributes are determined in this way, the CPU 21 advances to the concrete printing process consisting of step 703 and the remaining steps. First, in step 703, a variable n representing a row number (namely, a number assigned to a row or layer of sub-sections aligned in the direction of width of tape) is set at 1. Moreover, the tape is fed by the length of the front margin (indicated by reference character 2d in FIG. 24) without printing characters by driving the tape/ribbon feeding motor 31.

Next, the CPU 21 goes forward to step 704 whereupon the CG-ROM 24 is accessed according to a character code and a control code, which are stored in the RAM 23, and subsequently, output data of this CG-ROM 24 is stored in the printing memory 23a. Further, the CPU 21 drives the head drive circuit 34 according to the font information stored in the printing memory 23a. Thereby, a part of a character string preliminarily inputted by the user, which corresponds to an nth row of sub-sections of the tape T, is printed on this tape T. At the time of performing this access, the CPU 21 accesses the printing memory 23a corresponding to the enlargement ratio N designated by the user. Thereby, sub-sections of the tape belonging to the nth row, which is designated by the variable n, are printed at the enlargement ratio N designated by the user.

Here, in the case that the font information stored in the CG-ROM 24 is bit-map font information, the font information is represented by the arrangement of dot data in rows and columns, namely, by a set of two-dimensional dot data, each of which has a logical value "1" or "0". In the case of the normal printing, this font information is developed over the printing locations in the printing memory 23a, which are indicated by using lateral and longitudinal addresses, namely, two-dimensional addresses. Further, the thermal head 32 is driven in sequence according to the developed dot data. Thereby, each character can be printed according to a corresponding number of points, which is stored in the CG-ROM 24.

In contrast, in the case of the enlargement printing, N-fold dot data can be obtained by first repeatedly developing the same dot data N-times in the lateral direction, and subsequently, repeatedly developing the same dot data N-times in the longitudinal direction, during a development operation. Incidentally, the tape printing device may be adapted so that dot data corresponding sub-sections of tape, which belong to each row, may be read by controlling addresses when reading so as to drive the thermal head 32, after the font information is further developed for all rows of sub-sections of the tape when the font information is developed for sub-sections of the tape, which are of the first row (regarding an illustrated image of a result of the development, refer to FIG. 24(B)).

Further, in the case that the printing of a text written longitudinally or vertically on tape is designated at the time of performing such a development operation, dot data are read from the CG-ROM 24 by interchanging each longitudinal address with a corresponding lateral address and are then stored in the printing memory 23a.

In FIG. 25, reference characters MU denote a partial character string that corresponds to a sub-section (incidentally, this sub-section corresponds to an upper half of a resultant pseudo label) of the tape, which belongs to a first row, and is processed as above described and is printed on the tape T, in the case where 2 is selected as the enlargement ratio N.

Moreover, when printing the partial character string, the CPU 21 controls the driving width of the head drive circuit 4 according to a detection signal sent from the tape-width detecting sensor 12 in such a way that a margin is formed at each of the top and bottom edge portions of the tape T as viewed in the figure. Furthermore, when printing the partial character string, the CPU 21 causes the non-printing feeding of the tape T between characters, if necessary. Thereby, the partial character string can be printed at the character intervals set by the user.

Upon completion of printing the partial character string corresponding to the nth row in this way, the CPU 21 subsequently goes to step 705 whereupon the tape T is fed by the predetermined length without printing characters. Thereby, a blank portion (see 2d in FIG. 24(C)) to be provided at the rear end portion of a label is made.

Next, the CPU 21 goes to step 706 whereupon it is judged whether or not the value of the variable n is matched with the enlargement ratio N. Such a judgment is equivalent to a judgement made on whether or not the printing of all sub-sections of the tape is completed. Therefore, for instance, in the case that the enlargement ratio is 2, when the printing of only the upper half MU of the character string is finished, a negative result of this judgement is obtained. Thus, the CPU 21 goes to step 707.

The CPU 21 increments the variable n by 1 in step 707. Subsequently, in the next step 708, the CPU 21 causes the thermal head to print a marker M. Here, note that the marker M consists of, for example, two points (see FIG. 25), regardless of the enlargement ratio. Incidentally, the printing of the marker M may be performed by storing font information corresponding to the marker M in the character-generator ROM 24 and thereafter developing this font information in the printing memory 23a. Alternatively, the printing of the marker M may be performed by providing an on/off conversion circuit, which is operative to convert off-dots into on-dots selectively and forcefully when a command or instruction is given to a transfer path from the printing memory 23a to the head drive circuit 34, in the device.

The CPU 21 causes the thermal head to print the intersections among the boundaries of the top and bottom margin regions and the parting lines of the sub-sections of the nth and (n+1)th rows (alternatively, such intersections and several points adjacent to each of the intersections) as the markers M. Therefore, a user, who uses this printed tape, can eliminate the top and bottom margins easily and accurately by simply removing the top and bottom edge portions of the tape T by means of a cutter or the like by employing the markers M as reference points. Moreover, when a plurality of sub-parts of tape (T1 and T2) are stuck to one another, an occurrence of a blank portion or an unnatural overlap between the upper and lower character strings can effectively be prevented.

After printing the markers M in this manner, the CPU 21 goes to step 709 whereupon the tape T is fed by the predetermined length without printing characters. Thereby, the tape T is fed by a distance corresponding to the length of a blank part of the leading portion of a label. Thereafter, the CPU 21 returns to step 704. Then, the CPU 21 causes the thermal head to perform the printing operation on the second row of sub-sections of the tape.

Figure 25A:
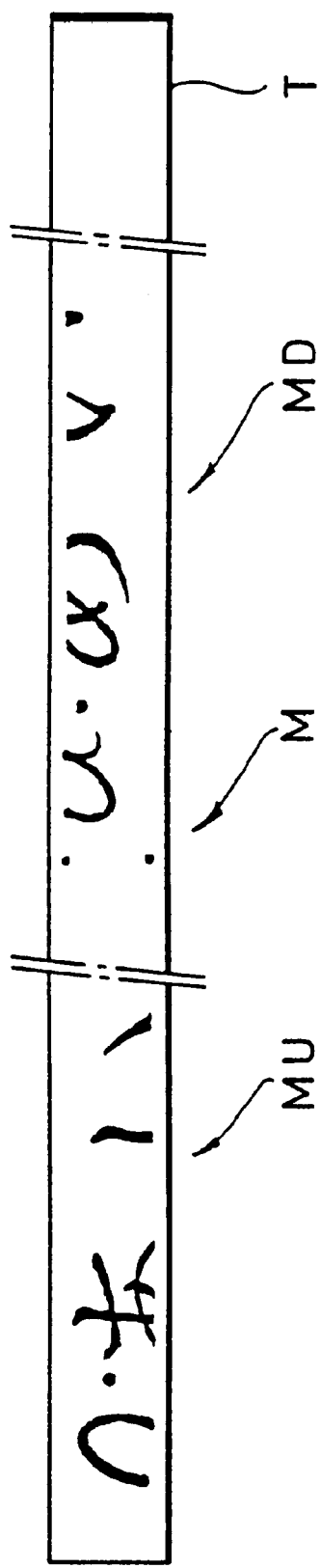
FIGS. 25(A) and 25(B) are diagrams showing tape surfaces, which illustrate the enlargement printing operation of the sixth embodiment of the present invention.

After performing the printing operation on the respective sub-sections of the tape repeatedly, when the printing of characters on the final row of sub-sections of the tape is finished (see, for example, a sub-section MD of FIG. 25(A)), an affirmative result of the judgement is obtained in step 706.

Then, the CPU 21 advances to step 710 whereupon the tape T is fed by the distance L (see FIG. 5) from the printing portion of the thermal head 32 to the cutters 38 and 39 without printing characters. Thus, this procedure is completed. The tape printing device returns to the state thereof obtained upon instructing the enlargement printing. As a result of this non-printing feeding of the tape, in the case of the sub-parts T1 and T2 to which the tape is divided by using, for example, the markers M as reference points, the distance between the terminating end position of the character string and that of the sub-part T1 of the tape and the distance between the terminating end position of the character string and that of the sub-part T2 of the tape can be maintained at an equal value.

Figure 25B:
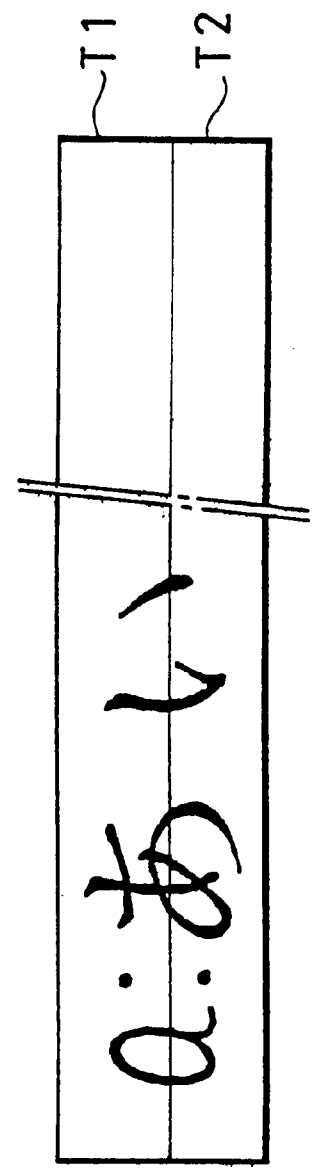

FIG. 25(A) illustrates the tape T discharged from the tape printing device after the enlargement printing is performed at the enlargement ratio of 2. After this tape T, the printing of which has been completed, is divided into two sub-parts T1 and T2 by using the positions of the markers M printed on the tape T as reference positions, the top and bottom margins of each of the sub-parts of the tape T are removed therefrom. Then, these sub-parts T1 and T2 are arranged in the direction of width of the tape and are further stuck on the spine of a file or the like. Thus, as illustrated in FIG. 25(B), a large label can be formed as if large characters were printed on a single wide tape.

Therefore, in accordance with the sixth embodiment, when partial character strings are serially printed so as to form a label having a width which is larger than the width of tape, the markers indicating the dividing positions are printed on the tape. Thereby, a user can cut the tape T in such a manner that the sizes of the front and rear end portions of each sub-part of the tape can be made to be equal to those of the front and rear end portions of any other sub-part thereof, respectively, namely, in such a way that an occurrence of a shift in position of each character among the sub-parts of the tape can effectively be prevented.

Further, in accordance with this embodiment, the marker definitely defines the top and bottom margins in the direction of width of the tape. Thereby, unnecessary top and bottom margins can be eliminated by using this marker as a reference position. Consequently, a pseudo wide label can be formed accurately.

Incidentally, in the foregoing description, the marker is formed by printing points in the case of the sixth embodiment. The present invention, however, is not limited thereto. For example, a cross-shaped mark, which has lateral and longitudinal sizes, may be employed as the marker.

Further, in the case of this embodiment, the top and bottom margins in the direction of width of the tape are indicated by the marker for indicating the dividing positions. A marker for indicating the top and bottom margins in the direction of the width of the tape may be provided separately from the marker for indicating the dividing positions.

Moreover, in the case of the tape printing device of this embodiment, the top and bottom margins in the direction of the width of the tape are automatically provided on the tape. The present invention, however, can be applied to a tape printing device that does not have the function of automatically forming the top and bottom margins.

In the foregoing description, there has been described the case that the marker is formed at the dividing position. Moreover, markers of such a kind may be printed at the forefront edge and the tail edge of the tape.

Incidentally, in the foregoing description, there has been described the tape printing device of this embodiment in which the enlargement printing is started by being provided with the operating element (namely, a dedicated operating element or a general purpose operating element) for the enlargement printing, which is different from the operating element for the normal printing. The tape printing device, however, may be adapted so that attributes concerning the kind of the printing are employed as the attributes of a character string and that the enlargement printing is started by judging what the attribute corresponding to an operating element for printing is, when this operating element for printing is operated. In this case, when the enlargement printing is selected, various kinds of attributes concerning the character string may be adapted to have values corresponding to the selected kind of the printing.

What is claimed:

1. A tape printing method, utilizing a print head for printing characters on a tape and a cutter, spaced from said print head, for cutting the tape, wherein a margin smaller than the distance between the print head and cutter can be formed, said method comprising:

feeding a tape at a normal printing speed to, in succession, the print head and the cutter;

decelerating the feeding to a stop and stopping the printing operation for a momentary time when the front end position of a printed text reaches a position a predetermined distance in advance of the cutter;

cutting the stopped tape to remove an unnecessary portion of the tape extending beyond said predetermined distance; and starting and accelerating tape feeding to the normal printing speed at the end of said momentary time; and printing the tape during said decelerating and accelerating by means of varying pulse width signals applied to the print head, said varying pulse width signals having pulse widths corresponding to tape movement during said deceleration and acceleration.

2. A tape printing method as claimed in claim 1, said method further comprising:

stopping the printing operation prior to completion responsive to a print stopping command;

feeding the tape, responsive to said stopping, a length approximately equal to the predetermined distance between the print head and the cutter; and cutter the printed tape with the cutter after the feeding which follows stopping of the printing.

3. The tape printing method according to claim 2, further comprising displaying on display means a message that the printing operation is stopped.

4. The tape printing method according to claim 2, further comprising:

turning off a power-supply for the printing apparatus responsive to the print stopping command after said feeding the tape said length equal to the predetermined distance without printing.

\* \* \* \* \*

UNITED STATES PATENT AND TRADEMARK OFFICE
CERTIFICATE OF CORRECTION

PATENT NO. : 6,270,269 B1
DATED : August 7, 2001
INVENTOR(S) : Watanabe et al.

It is certified that error appears in the above-identified patent and that said Letters Patent is hereby corrected as shown below:

Column 3,
Line 52, "vertically" should read -- vertical --.

Column 6,
Line 13, "congruity" should read -- incongruity --.

Column 17,
Line 9, "sellected" should read -- selected --.

Column 27,
Line 66, "PU" should read -- CPU --.

Column 31,
Line 35, after "When" insert -- processing --.

Column 38,
Line 26, after "; and" begin a new paragraph with "starting"; and
Line 42, "cutter" should read -- cutting --.

Signed and Sealed this

Tenth Day of September, 2002

*Attest:*

*Attesting Officer*

JAMES E. ROGAN
*Director of the United States Patent and Trademark Office*